(12) United States Patent
Pydin

(10) Patent No.: US 11,341,857 B2
(45) Date of Patent: May 24, 2022

(54) DRONE COORDINATION DEVICE, VEHICLE MANAGEMENT DEVICE, DRONE COORDINATION METHOD, AND PROGRAM

(71) Applicant: HONDA MOTOR CO., LTD., Tokyo (JP)

(72) Inventor: Andrii Pydin, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 218 days.

(21) Appl. No.: 16/621,069

(22) PCT Filed: Jun. 15, 2018

(86) PCT No.: PCT/JP2018/022831
§ 371 (c)(1),
(2) Date: Dec. 10, 2019

(87) PCT Pub. No.: WO2018/230680
PCT Pub. Date: Dec. 20, 2018

(65) Prior Publication Data
US 2020/0202722 A1 Jun. 25, 2020

(30) Foreign Application Priority Data
Jun. 16, 2017 (JP) .............................. JP2017-119026

(51) Int. Cl.
*G08G 5/00* (2006.01)
*G07C 5/00* (2006.01)
(Continued)

(52) U.S. Cl.
CPC ......... *G08G 5/0034* (2013.01); *B64C 39/024* (2013.01); *G05D 1/101* (2013.01);
(Continued)

(58) Field of Classification Search
CPC .. G08G 5/0034; G08G 5/0013; G08G 5/0069; G08G 5/0082; G08G 1/205;
(Continued)

(56) References Cited

U.S. PATENT DOCUMENTS 9,501,061 B2 * 11/2016 Canoy ................. G05D 1/0816
10,553,122 B1 * 2/2020 Gilboa-Amir ..... G06Q 10/0832
(Continued)

FOREIGN PATENT DOCUMENTS

| CN | 103914076 | 7/2014 |
| CN | 104797995 | 7/2015 |

(Continued)

OTHER PUBLICATIONS

Chinese Office Action for Chinese Patent Application No. 201880038533.5 dated Jun. 25, 2021.
(Continued)

*Primary Examiner* — Yonel Beaulieu
(74) *Attorney, Agent, or Firm* — Amin, Turocy & Watson, LLP

(57) ABSTRACT

A drone coordination device includes an acquisitor which acquires an action plan from an automated vehicle and a determinator which determines a flight plan of a drone including a section in which the drone will be mounted on the automated vehicle on the basis of the action plan acquired by the acquisitor.

15 Claims, 14 Drawing Sheets

(51) Int. Cl.
  *G05D 1/00* (2006.01)
  *G05D 1/10* (2006.01)
  *B64C 39/02* (2006.01)
  *G05D 1/02* (2020.01)

(52) U.S. Cl.
  CPC ........ *G07C 5/008* (2013.01); *B64C 2201/027* (2013.01); *B64C 2201/128* (2013.01); *B64C 2201/141* (2013.01); *G05D 1/0212* (2013.01); *G05D 1/0276* (2013.01); *G05D 2201/0213* (2013.01)

(58) Field of Classification Search
  CPC ................ G08G 1/0112; B64C 39/024; B64C 2201/027; B64C 2201/128; B64C 2201/141; B64C 13/18; B64C 27/08; B64C 39/02; G05D 1/101; G05D 1/0212; G05D 1/0276; G05D 2201/0213; G05D 1/0684; G07C 5/008; B65G 61/00; G01C 21/00
  See application file for complete search history.

(56) References Cited

U.S. PATENT DOCUMENTS

| | | |
|---|---|---|
| 2017/0039510 A1 | 2/2017 | Ogilvie et al. |
| 2017/0160735 A1* | 6/2017 | Mikan ................ G08G 5/0034 |
| 2017/0278406 A1* | 9/2017 | Akselrod ............. G08G 5/0039 |

FOREIGN PATENT DOCUMENTS

| | | |
|---|---|---|
| CN | 106656310 | 5/2017 |
| CN | 106828264 | 6/2017 |
| CN | 106843279 | 6/2017 |
| JP | 5819555 | 11/2015 |
| JP | 2016-194844 | 11/2016 |
| JP | 2017-052389 | 3/2017 |
| JP | 2017-061168 | 3/2017 |

OTHER PUBLICATIONS

International Search Report and Written Opinion for International Application Serial No. PCT/JP2018/022831 dated Aug. 28, 2018, 6 pages.

* cited by examiner

FIG. 6
321
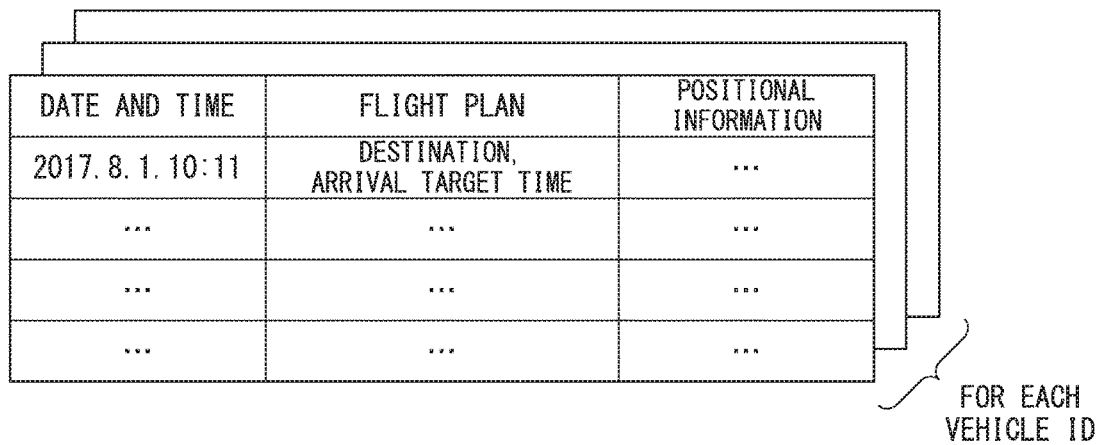
FIG. 7
322
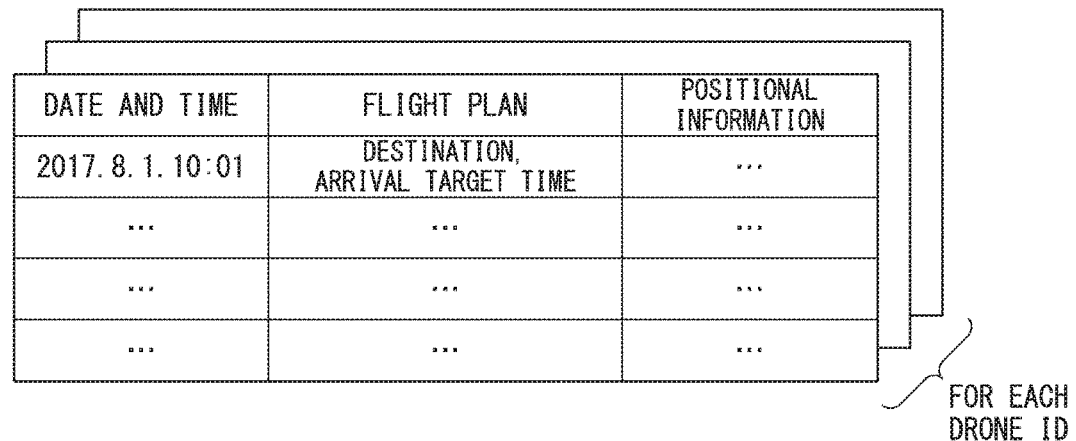
FIG. 8
324
| DRONE ID | DEPARTURE PLACE | DESTINATION | TIME CONDITION | OPTIMAL ROUTE | VEHICLE ID | ACCOMPANYING TRAVEL STATE |
|---|---|---|---|---|---|---|
| D0003 | S1 | G1 | 2017. 8. 3. 10:00 | ... | C0003 | BEFORE ACCOMPANYING TRAVEL |
| ... | ... | ... | ... | ... | ... | ... |
| ... | ... | ... | ... | ... | ... | ... |
| ... | ... | ... | ... | ... | ... | ... |

| VEHICLE ID | DELIVERY | TIME CONDITION | DRONE ID | DELIVERY STATE | DELIVERY ROUTE |
|---|---|---|---|---|---|
| C0005 | TEA, LUNCH | 2017.8.1.10:10-20 | D0003 | DURING DELIVERY | ... |
| ... | ... | ... | ... | ... | ... |
| ... | ... | ... | ... | ... | ... |
| ... | ... | ... | ... | ... | ... |

DRONE COORDINATION DEVICE, VEHICLE MANAGEMENT DEVICE, DRONE COORDINATION METHOD, AND PROGRAM

TECHNICAL FIELD

Embodiments of the present invention relate to a drone coordination device, a vehicle management device, a drone coordination method, and a program.

Priority is claimed on Japanese Patent Application No. 2017-119026, filed Jun. 16, 2017, the content of which is incorporated herein by reference.

BACKGROUND ART

Recently, the expectation for business development using drones has increased. For example, various services can be provided by capturing images in the sky or carrying supplies using drones (refer to Patent Literature 1).

On the other hand, research on automated driving of vehicles has been conducted (refer to Patent Literature 2).

CITATION LIST

Patent Literature

[Patent Literature 1]
Japanese Unexamined Patent Application, First Publication No. 2017-052389
[Patent Literature 2]
Japanese Unexamined Patent Application, First Publication No. 2017-61168

SUMMARY OF INVENTION

Technical Problem

However, there are cases in which it is difficult to promote coordination of a vehicle and a drone because both are moving objects.

An object of the present invention devised in view of such circumstances is to provide a drone coordination device, a vehicle management device, a drone coordination method, and a program which can support coordination of a vehicle and a drone.

Solution to Problem

A drone coordination device, a vehicle management device, a drone coordination method, and a program according to the present invention employ the following configurations.

(1): One aspect of the present invention is a drone coordination device including: an acquisitor which acquires an action plan from an automated vehicle; and a determinator which determines a flight plan of a drone including a section in which the drone will be mounted on the automated vehicle on the basis of the action plan acquired by the acquisitor.

(2): In the aforementioned aspect of (1), the determinator may determine a flight plan of the drone in a state in which the drone holds a delivery.

(3): In the aforementioned aspect of (1), the determinator may determine a timing at which the drone will approach the automated vehicle on the basis of the action plan and instruct the drone to approach the automated vehicle at the determined timing.

(4): In the aforementioned aspect of (1), the determinator may instruct the drone to approach the automated vehicle at a timing at which a travel speed of the automated vehicle becomes equal to or less than a predetermined speed.

(5): In the aforementioned aspect of (1), the determinator may request that the automated vehicle change the action plan when there is no timing at which the travel speed of the automated vehicle will become equal to or less than the predetermined speed within a predetermined range including a point at which the drone will approach the automated vehicle.

(6): In the aforementioned aspect of (1), the determinator may provide an incentive to the automated vehicle which has changed the action plan according to a request for change of the action plan.

(7): In the aforementioned aspect of (1), the drone coordination device may further include an accompanying travel manager which determines an automated vehicle on which the drone will be mounted on the basis of a departure place and a destination of the drone and requests that the determined automated vehicle mount the drone in a predetermined section.

(8): In the aforementioned aspect of (1), the drone coordination device may further include a delivery manager which receives a delivery request from the automated vehicle, determines a drone which will deliver a delivery to the automated vehicle on the basis of received delivery details, and request delivery to the automated vehicle for the determined drone.

(9): One aspect of the present invention is a vehicle management device including: a state acquisitor which acquires an action plan from an automated vehicle; a utilization authorizer which determines a route section of the automated vehicle in which a drone can be mounted on the automated vehicle on the basis of the action plan acquired by the state acquisitor and authorizes mounting of the drone on the automated vehicle; and a communicator which transmits vehicle information of the automated vehicle to the outside while the automated vehicle travels in the route section.

(10): In the aforementioned aspect of (9), the communicator may receive a vehicle operation request from the outside and output information for identifying a plurality of automated vehicles on the basis of the received vehicle operation request, and the state acquisitor may acquire a state of the automated vehicle on the basis of information for identifying the automated vehicle.

(11): In the aforementioned aspect of (9), the vehicle management device may include: a utilization state detector which detects whether the automated vehicle and the drone are in an accompanying travel state; and a result derivation unit which derives a utilization result on the basis of at least one of a travel distance and a travel time of the automated vehicle from start to end of the accompanying travel state.

(12): In the aforementioned aspect of (9), the communicator may include a result derivation unit which causes the automated vehicle to transmit the utilization result to the outside and receive the utilization result transmitted to the outside.

(13): In the aforementioned aspect of (9), the acquisitor may acquire attribute information of the drone from the automated vehicle and the result derivation unit may derive the utilization result on the basis of the mass of the drone.

(14): The attribute information may include mass information of the drone.

(15): The attribute information may include manufacture information of the drone.

(16): One aspect of the present invention is a drone coordination method including: acquiring an action plan from an automated vehicle; and determining a flight plan of a drone including a section in which the drone will be mounted on the automated vehicle on the basis of the acquired action plan.

(17): One aspect of the present invention is a non-transitory computer-readable storage medium that stores an in-vehicle control program to be executed by an in-vehicle computer to perform at least program causing a computer to: acquire an action plan from an automated vehicle; and determine a flight plan of a drone including a section in which the drone will be mounted on the automated vehicle on the basis of the acquired action plan.

Advantageous Effects of Invention

According to the invention disclosed in (1) to (17), it is possible to support coordination of a vehicle and a drone.

According to the invention disclosed in (9) to (15), it is possible to support coordination of a vehicle and a drone by a third operator other than an operator who manages the vehicle and an operator who manages the drone.

BRIEF DESCRIPTION OF DRAWINGS

FIG. 6 is a diagram illustrating an example of vehicle information 321.

FIG. 7 is a diagram illustrating an example of drone information 322.

FIG. 8 is a diagram illustrating an example of accompanying travel management information 324.

FIG. 9 is a diagram illustrating an example of delivery management information 325.

DESCRIPTION OF EMBODIMENTS

Hereinafter, embodiments of a drone coordination device, a vehicle management device, a drone coordination method, and a program of the present invention will be described with reference to the drawings. In this system, a vehicle is, for example, essentially an automated vehicle which does not require driving operation. For example, a vehicle may be a vehicle having four or more vehicle wheels, an automated two-wheeled vehicle or other vehicles.

First Embodiment

Figure 1:
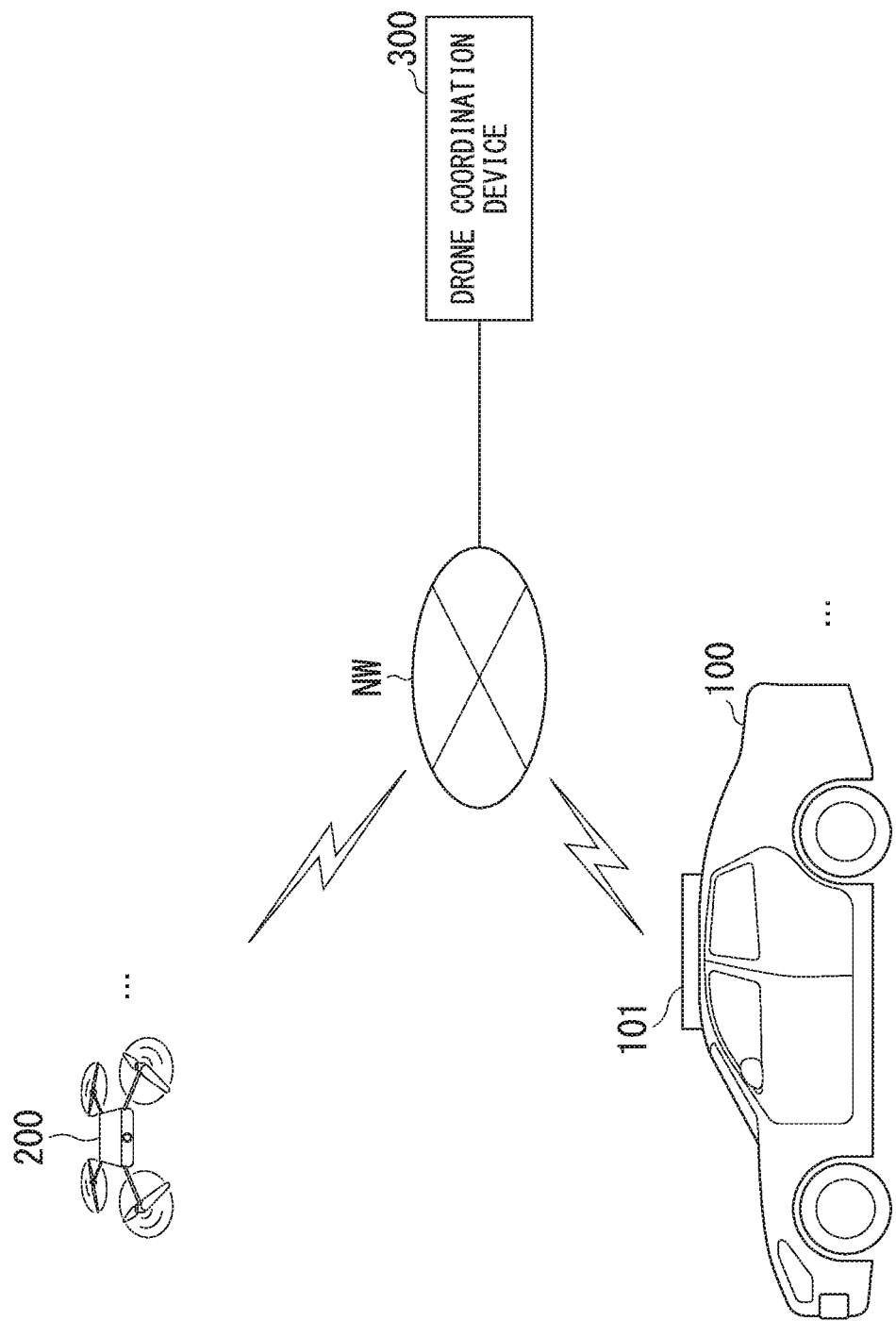
FIG. 1 is a configuration diagram of a drone coordination system 1.

FIG. 1 is a configuration diagram of a drone coordination system 1. The drone coordination system 1 includes one or more vehicles 100, one or more drones 200, and a drone coordination device 300. These components can communicate with one another through a network NW. The network NW includes the Internet, a wide area network (WAN), a local area network (LAN), a public line, a provider device, a dedicated line, a wireless base station, and the like.

[Vehicle]

A supporting mechanism 101 which supports the drone 200, for example, is attached to the top of the vehicle 100. The supporting mechanism 101 connects the vehicle 100 and the drone 200. The supporting mechanism 101 may be connected to the drone 200 using a tool having a connecting structure or an electromagnet. Further, the supporting mechanism 101 may include charging equipment and supply power to the connected drone 200 in a contact or non-contact manner. The power supplied by the supporting mechanism 101 to the drone 200 may be a predetermined fixed amount of power or a maximum charging amount of the drone 200 and may be changed according to power that can be supplied from the vehicle 100.

Figure 2:
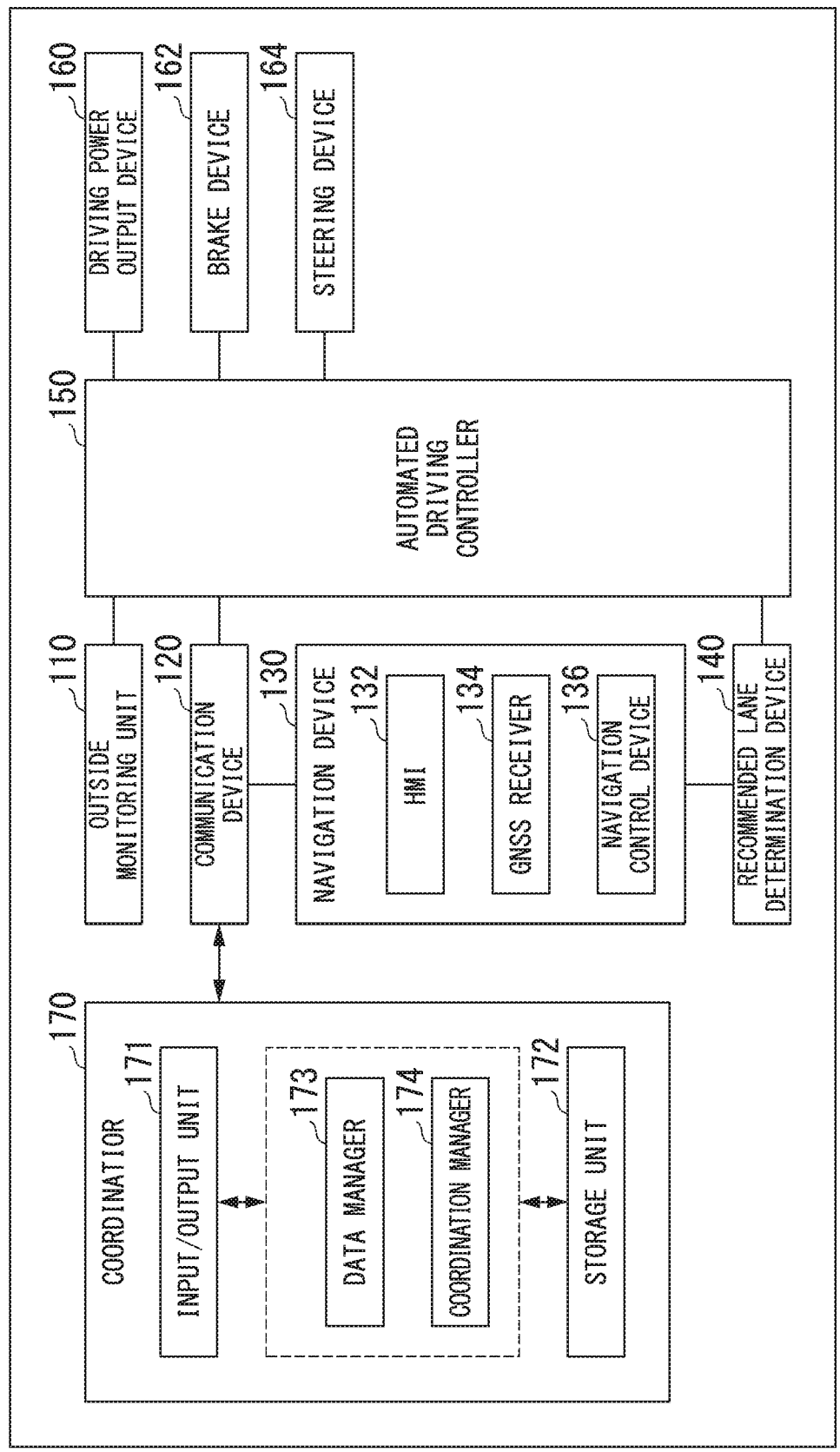
FIG. 2 is a configuration diagram of a vehicle 100.

FIG. 2 is a configuration diagram of the vehicle 100. The vehicle 100 includes, for example, an outside monitoring unit 110, a communication device 120, a navigation device 130, a recommended lane determination device 140, an automated driving controller 150, a driving power output device 160, a brake device 162, a steering device 164, and a coordinator 170.

The outside monitoring unit 110 includes, for example, a camera, a radar, a light detection ranging (LIDAR) device, an object recognition device which performs sensor fusion processing on the basis of outputs of these components, and the like. The outside monitoring unit 110 estimates types of object (particularly, vehicles, pedestrians and bicycles) around the vehicle 100 and outputs the estimated types along with information on positions and speeds thereof to the automated driving controller 150.

The communication device 120 is, for example, a wireless communication module for accessing the network NW or directly communicating with other vehicles, terminal devices of pedestrians, or the like. The communication device 120 performs wireless communication on the basis of Wi-Fi, dedicated short range communications (DSRC), Bluetooth (registered trademark) and other communication standards. A plurality of communication devices suitable for purposes may be provided as the communication device 120.

The navigation device 130 includes, for example, a human machine interface (HMI) 132, a global navigation satellite system (GNSS) receiver 134, and a navigation control device 136. The HMI 132 includes, for example, a touch panel type display device, a speaker, a microphone, and the like. The GNSS receiver 134 identifies the position thereof (the position of the vehicle 100) on the basis of radio waves received from a GNSS satellite (e.g., GPS satellite). The navigation control device 136 includes, for example, a central processing unit (CPU) and various storage devices and controls the entire navigation device 130. Map information (navigation maps) is stored in storage devices. Navigation maps are maps which represent roads using nodes and links.

The navigation control device 136 determines a route from the position of the vehicle 100 identified by the GNSS receiver 134 to a destination designated using the HMI 132 with reference to navigation maps. In addition, the navigation control device 136 may transmit information on the position of the vehicle 100 and the destination to a navigation server (not shown) using the communication device 120 and acquire a route returned from the navigation server. The destination may be designated by a user using the HMI 132. The route may include information on a point at which the vehicle stops to allow the user to enter or exit the vehicle and an arrival target time. The navigation control device 136 outputs information on the route determined through any of the aforementioned methods to the recommended lane determination device 140.

The recommended lane determination device 140 includes, for example, a micro-processing unit (MPU) and various storage devices. Detailed map information with higher accuracy than that of navigation maps is stored in storage devices. Map information with higher accuracy includes, for example, information on a road width, gradient and curvature of each lane, positions of signals, and the like. The recommended lane determination device 140 determines recommended lanes desirable for traveling along a route input from the navigation device 130 and outputs the recommended lanes to the automated driving controller 150.

The automated driving controller 150 includes one or more processors such as a CPU and an MPU and various storage devices. The automated driving controller 150 causes the vehicle 100 to automatically travel such that the vehicle 100 avoids contact with objects whose positions and speeds have been input from the outside monitoring unit 110 on the principle of traveling in recommended lanes determined by the recommended lane determination device 140. The automated driving controller 150 may determine various events and sequentially execute the events, for example. Events include a constant-speed travel event of traveling in the same travel lane at a constant speed, a following travel event of following a preceding vehicle, low-speed travel event, a lane change event, a merging event, a branching event, an emergency stop event, a tollgate event for passing through a tollgate, a handover event for ending automated driving and switching to manual driving, and the like. In addition, an action for avoidance may be planned on the basis of surrounding situations (presence of neighboring vehicles and pedestrians, land narrowing due to road construction, and the like) of the vehicle 100 during execution of such events.

The automated driving controller 150 generates a target trajectory through which the vehicle 100 will travel in the future. For example, a target trajectory may include a speed factor. For example, a target trajectory may be represented as sequential arrangement of points (trajectory points) at which a host vehicle M will arrive. A trajectory point is a point at which the host vehicle M will arrive for each predetermined traveling distance, and a target speed and a target acceleration for each predetermined sampling time (e.g., approximately every several tenths of a second) are generated as a part of a target trajectory separately from trajectory points. In addition, a trajectory point may be a position at which the host vehicle M will arrive at a sampling time for each predetermined sampling time. In this case, information on a target speed and a target acceleration are represented as intervals between trajectory points.

Figure 3:
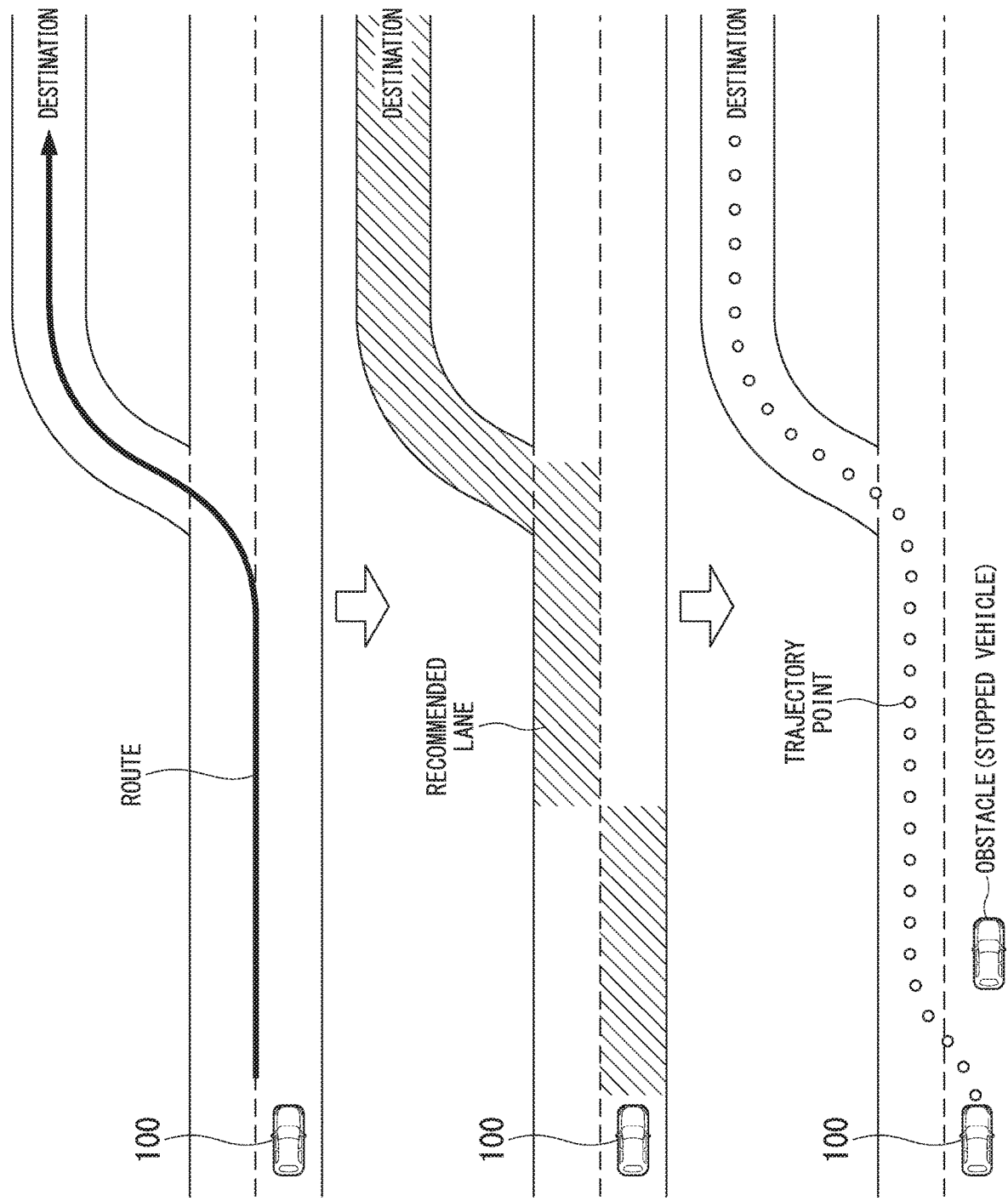
FIG. 3 is a diagram for describing an automated driving processing procedure.

FIG. 3 is a diagram for describing an automated driving processing procedure. First, the navigation device 130 determines a route as illustrated in the upper figure. This route is, for example, a rough route on which lanes are not distinguished. Next, the recommended lane determination device 140 determines recommended lanes in which the vehicle will easily travel along the route as illustrated in the middle figure. Then, the automated driving controller 150 generates trajectory points for traveling along the recommended lanes as long as possible while avoiding obstacles and the like and controls some or all of the driving power output device 160, the brake device 162 and the steering device 164 such that the vehicle travels along the trajectory points (and an associated speed profile) as illustrated in the lower figure. Meanwhile, such distribution of roles is merely an example and, for example, the automated driving controller 150 may perform processing in an integrated manner.

The driving power output device 160 outputs a travel driving power (torque) for traveling of a vehicle to driving wheels. The driving power output device 160 includes, for example, a combination of an internal combustion engine, a motor, a transmission and the like, and a power electronic control unit (ECU) which controls these components. The power ECU controls the aforementioned components according to information input from the automated driving controller 150 or information input from a driving operator which is not illustrated.

The brake device 162 includes, for example, a brake caliper, a cylinder which transfers a hydraulic pressure to the brake caliper, an electric motor which generates a hydraulic pressure in the cylinder, and a brake ECU. The brake ECU controls the electric motor according to information input from the automated driving controller 150 or information input from the driving operator such that a brake torque according to the braking operation is output to each vehicle wheel. The brake device 162 may include a mechanism for transferring a hydraulic pressure generated by an operation of the brake pedal included in the driving operator to the cylinder through a master cylinder as a backup. Meanwhile, the brake device 162 is not limited to the above-described configuration and may be an electronically controlled hydraulic brake device which controls an actuator according to information input from the automated driving controller 150 and transfers a hydraulic pressure of a master cylinder to a cylinder.

The steering device 164 includes, for example, a steering ECU and an electric motor. For example, the electric motor may change the direction of the steered wheel by applying a force to a rack-and-pinion mechanism. The steering ECU drives the electric motor according to information input from the automated driving controller 150 or information input from the driving operator to change the direction of the steered wheel.

The coordinator 170 includes an input/output unit 171, a storage unit 172, a data manager 173, and a coordination manager 174.

The input/output unit 171 includes an input unit such as a mouse, a keyboard, a touch panel, a microphone, a sensor and camera, for example, and an output unit such as a display and a speaker, for example. The storage unit 172 is realized by a hard disk drive (HDD), a flash memory, a random access memory (RAM), a read only memory (ROM), and the like.

The data manager 173 and the coordination manager 174 are realized, for example, by a processor such as a CPU executing a program (software) stored in the storage unit 172. Further, one or both of these functional units may be realized by hardware such as a large scale integration (LSI) circuit, an application specific integrated circuit (ASIC), a field-programmable gate array (FPGA) and a graphics processing unit (GPU) or realized by software and hardware in cooperation.

The data manager 173 transmits, to the drone coordination device 300, positional information of the vehicle 100 identified by the GNSS receiver 134 and an action plan of the vehicle 100 at a predetermined timing using the communication device 120. The action plan includes, for example, a route determined by the navigation device 130, an event executed by the automated driving controller 150, and the like.

The coordination manager 174 performs various types of processing on the basis of information received from the drone coordination device 300 using the communication device 120, information input from the input/output unit 171, and the like. For example, the coordination manager 174 may perform processing of causing the input/output unit 171 to display a predetermined screen, processing of designating a type of information and a timing at which it is to be transmitted to the drone coordination device 300 for the data manager 173, and the like. In addition, the coordination manager 174 transmits information representing details coordinated with the drone 200 (e.g., an accompanying travel situation, a delivery situation and the like which will be described later) to the drone coordination device 300 using the communication device 120.

[Drone]

The drone 200 is an unmanned aerial vehicle and flies according to remote operation or automated operation. The drone 200 waits at, for example, a drone station, a delivery center and the like installed at various places and flies according to a designated flight plan when a flight start indication is received from the drone coordination device 300. Then, the drone 200 returns to a nearby drone station or delivery center.

Figure 4:
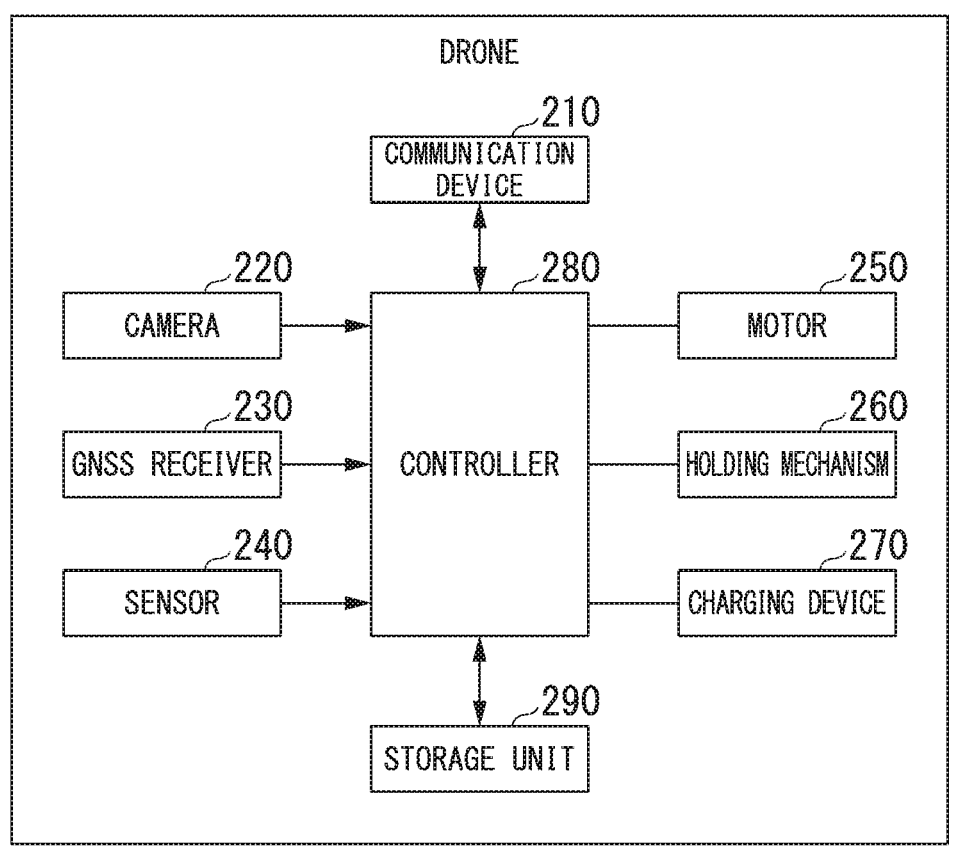
FIG. 4 is a functional configuration diagram of a drone 200.

FIG. 4 is a functional configuration diagram of the drone 200. The drone 200 includes, for example, a communication device 210, a camera 220, a GNSS receiver 230, a sensor 240, a motor 250, a holding mechanism 260, a charging device 270, a controller 280 and a storage unit 290.

The communication device 210 is, for example, a communication interface for accessing the network NW or directly communicating with a transportation management device 400. For example, the communication device 210 may include a network interface card (NIC) and perform wireless communication on the basis of Wi-Fi, dedicated short range communications (DSRC), Bluetooth (registered trademark) and other communication standards. A plurality of communication devices suitable for purposes may be provided as the communication device 210.

The camera 220 is, for example, a digital camera using a solid state imaging device such as a charge coupled device (CCD) or a complementary metal oxide semiconductor (CMOS). One or a plurality of cameras 220 are attached to any part of the drone 200. The GNSS receiver 230 identifies the position thereof (the position of the drone 200) on the basis of radio waves from GNSS satellites (e.g., GPS satellites). The sensor 240 is, for example, a magnetic sensor, a triaxial gyro sensor, a triaxial acceleration sensor, and the like.

The motor 250 includes a plurality of motors and a propeller is attached to each motor. The holding mechanism 260 includes, for example, an arm, a hook, a storage case and the like and is fixed to the drone 200 such that it can detach deliveries or the like. The charging device 270 includes a rechargeable battery and supplies power to each part of the drone 200. In addition, the charging device 270 includes a connector for charging the rechargeable battery.

The controller 280 is realized, for example, by a processor such as a CPU executing a program (software) stored in the storage unit 290. Further, one or both of these functional units may be realized by hardware such as an LSI circuit, an ASIC, an FPGA and a GPU or realized by software and hardware in cooperation. For example, the controller 280 may control the motor 250 according to a flight plan or control the holding mechanism 260 such that it detaches a delivery when the drone 200 has approached the vehicle 100. In addition, the controller 280 transmits information representing details of coordination with the vehicle 100 (e.g., an accompanying travel situation, a delivery situation or the like which will be described later) to the drone coordination device 300 using the communication device 210.

The controller 280 may analyze an image captured by the camera 220, acquire the type, color, number and the like of a vehicle that is an approaching target and identify the approaching target or derive a distance to the vehicle that is an approaching target and a relative positional relationship with the vehicle on the basis of the image captured by the camera 220.

In addition, the controller 280 may identify the vehicle that is an approaching target and derive a distance to the vehicle and a relative positional relationship with the vehicle according to communication with the vehicle 100 using the communication device 210.

A flight plan includes a flight path, an altitude, a speed, a flight mode, and the like. Flight modes include ascending, linear flight, descending, hovering, parallel flight, and the like. The parallel flight is flight following a movement of a target moving object. The controller 280 may control flight according to a flight plan created by the drone coordination device 300 or create a flight plan on the basis of conditions such as a departure place, a destination and an arrival time designated by the drone coordination device 300. The controller 280 transmits information representing the position of the drone 200 identified by the GNSS receiver 230 and a most recent flight plan to the drone coordination device 300 using the communication device 210 at a predetermined timing.

The storage unit 290 stores a control program in the controller 280 and various types of data (e.g., a flight plan and the like) used in processing of the controller 280. In addition, the storage unit 290 secures an image buffer area for storing images captured by the camera 220.

[Drone Coordination Device]

Figure 5:
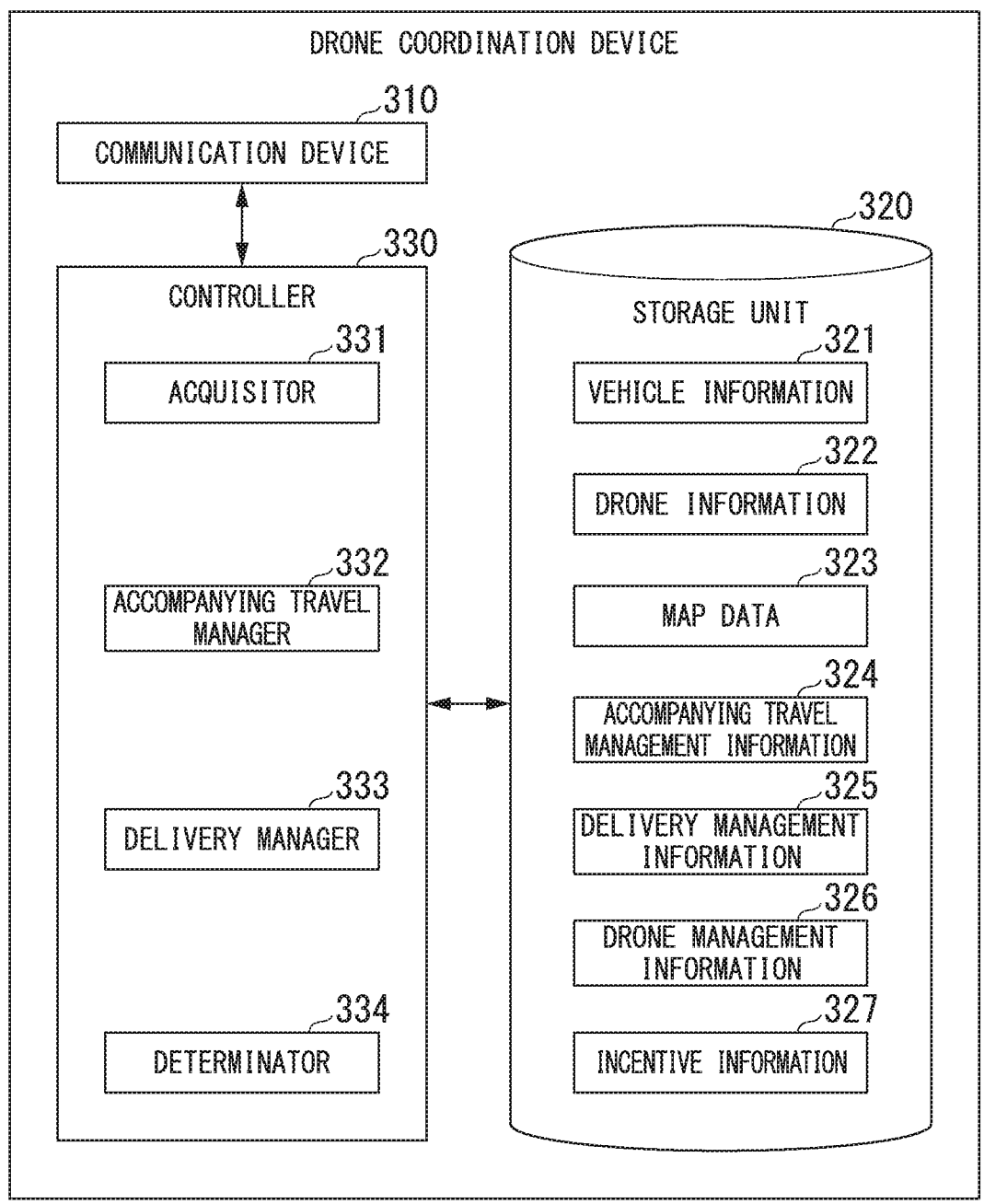
FIG. 5 is a functional configuration diagram of a drone coordination device 300.

Next, the drone coordination device 300 will be described with reference to FIGS. 5 to 9. FIG. 5 is a functional configuration diagram of the drone coordination device 300. The drone coordination device 300 includes, for example, a communication device 310, a storage unit 320 and a controller 330. The communication device 310 is, for example, an NIC for connecting to the network NW. The communication device 310 communicates with the vehicle 100 and the drone 200 through the network NW. The storage unit 320 is realized by an HDD, a flash memory, a RAM, a ROM, or the like.

The controller 330 includes, for example, an acquisitor 331, an accompanying travel manager 332, a delivery manager 333 and a determinator 334. Some or all of these components are realized, for example, by a processor such as a CPU executing a program (software) stored in the storage unit 320. In addition, some or all of these functional units may be realized by hardware such as an LSI circuit, an ASIC, an FPGA or a GPU or realized by software and hardware in cooperation.

The acquisitor 331 acquires various types of information from the vehicle 100 and the drone 200 using the communication device 310 and stores the information in the storage unit 320. For example, the acquisitor 331 may receive positional information representing the position of the vehicle 100 and an action plan from the vehicle 100 using the communication device 310 and store the positional information and the action plan in vehicle information 321 of the storage unit 320. In addition, the acquisitor 331 receives positional information representing the position of the drone 200 and a flight plan from the drone 200 using the communication device 310 and store the positional information and the flight plan in drone information 322 of the storage unit 320. Meanwhile, when the drone 200 has changed a part of a flight plan, the drone coordination device 300 may receive changed information from the drone 200 because the drone coordination device 300 creates flight plans. Further, the acquisitor 331 may receive attribute information of the drone 200 from the drone 200. Attribute information is, for example, mass information about the mass of the drone 200 and manufacture information (e.g., a manufacturer, a manufacture type number, and a serial number identifying an individual) on the drone 200.

The vehicle information 321 is information including positional information, an action plan and the like updated in the vehicle 100. FIG. 6 is a diagram illustrating an example of the vehicle information 321. As illustrated in FIG. 6, the vehicle information 321 is information in which an action plan and positional information are associated with a date and time and is stored, for example, in a table provided for each vehicle 100. The vehicle 100 regularly transmits the vehicle information 321 to the drone coordination device 300.

The drone information 322 is information including positional information, a flight plan and the like updated in the drone 200. FIG. 7 is a diagram illustrating an example of the drone information 322. As illustrated in FIG. 7, the drone information 322 is information in which a flight plan and positional information are associated with a date and time and is stored, for example, in a table provided for each drone 200.

Map data 323 includes map information representing roads using nodes and links, information representing positions, heights and the like of structures such as buildings, overpasses, signals and wires, and the like.

The accompanying travel manager 332 determines a vehicle 100 on which the drone 200 will be mounted on the basis of a departure place and a destination of the drone 200 and requests that the determined vehicle 100 mounts the drone 200 in a predetermined section. Hereinafter, a movement of the drone 200 mounted on the vehicle 100 during movement from a departure place to a destination is referred to as accompanying with the vehicle 100. The accompanying travel manager 332 determines a vehicle traveling along an optimal route from among a plurality of vehicles 100 as a vehicle on which the drone 200 will be mounted, for example, with reference to the map data 323. The optimal route is a route from a departure place to a destination of the drone 200 which includes a section in which the drone 200 is mounted on the vehicle 100 in at least a part thereof and is an optimized route from among routes on the assumption that the drone 200 accompanies with each vehicle 100 that is an accompanying travel candidate A vehicle 100 that is an accompanying travel candidate is a vehicle 100 which can lead the drone 200 from the side of a departure place to the side of a destination by mounting the drone 200 thereon and moving along with the drone 200. For example, the accompanying travel manager 332 may acquire a vehicle whose traveling within a predetermined range including a departure place or a destination of the drone 200 is included in an action plan as a vehicle 100 that is an accompanying travel candidate with reference to the vehicle information 321.

The accompanying travel manager 332 determines, as an optimal route, a flight route which satisfies optimization conditions from among flight routes along which the drone 200 accompanies with each vehicle 100 that is an accompanying travel candidate. The optimization conditions may be arbitrarily set and, for example, the accompanying travel manager 332 may determine, as an optimal route, a route having a shortest travel time from a departure place to a destination of the drone 200, a route having a shortest travel distance, a route having a smallest number of accompanying vehicles 100, or the like. The accompanying travel manager 332 stores details of accompanying travel including the optimal route in accompanying travel management information 324 of the storage unit 320. In addition, the accompanying travel manager 332 updates the accompanying travel management information 324 when information representing an accompanying travel state is received from the vehicle 100 or the drone 200 using the communication device 310.

The accompanying travel management information 324 is information representing details of an accompanying travel. FIG. 8 is a diagram illustrating an example of the accompanying travel management information 324. As illustrated in FIG. 8, the accompanying travel management information 324 is information in which a departure place, a destination, a time condition, an optimal route, a vehicle ID and an accompanying travel state are associated with a drone ID. The drone ID is unique information for identifying each drone 200 and represents a drone 200 which requests travel accompanying with a vehicle 100. The departure place and the destination are a departure place and a destination of the drone 200 which requests accompanying travel. The time condition is a time condition requested by the drone 200 and includes, for example, a time of departure from a departure place, a time of arrival at a destination, and the like. The optimal route is an optimal route determined by the accompanying travel manager 332. The vehicle ID is unique information for identifying each vehicle 100 and represents a vehicle 100 determined the accompanying travel manager 332 to travel accompanying with the drone 200. The accompanying travel state is information representing an accompanying travel state of the drone 200 and includes, for example, moving to a vehicle, accompanying traveling, completion of accompanying traveling, arrival at a destination, and the like.

The delivery manager 333 receives a delivery request from a vehicle 100, determines a drone 200 which will deliver a delivery to the vehicle 100 on the basis of the received delivery details and requests delivery to the vehicle 100 for the determined drone 200. For example, the delivery manager 333 may select, from drones 200 registered in drone management information 326, a drone which is of a type capable of holding a designated delivery and can make a round trip to the vehicle 100 which requests delivery under a designated time condition from among a plurality of drones 200 on the basis of reservation states before and after the designated time condition. The delivery manager 333 stores delivery details including a drone caused to perform delivery in delivery management information 325 of the storage unit 320. In addition, the delivery manager 333 updates the delivery management information 325 when information representing a delivery state is received from the vehicle 100 or the drone 200 using the communication device 310 or the determinator 334 determines a flight route.

The delivery management information 325 is information representing delivery details. FIG. 9 is a diagram illustrating an example of the delivery management information 325. As illustrated in FIG. 9, the delivery management information 325 is information in which a delivery, a time condition, a drone ID, a delivery state and a delivery route are associated with a vehicle ID. The vehicle ID is information representing a vehicle 100 which requests delivery. The delivery is information representing the name, number and the like of a delivery requested by the vehicle 100. The time condition is a time condition requested by the vehicle 100 and includes, for example, a time zone in which delivery is desired. The drone ID is information representing a drone determined by the delivery manager 333 as a drone 200 which will deliver a delivery to the vehicle 100. The delivery state is information representing a delivery state of the drone 200 and includes, for example, in preparation of delivery, in delivery, completion of delivery, and the like. The delivery route is a flight route including a flight plan determined by the determinator 334.

The drone management information 326 is information about a prepared drone 200 and is, for example, information in which a drone station in which the drone 200 waits, a current position of the drone 200, a current state of the drone, address necessary for communication with the drone 200, and the like are associated with a drone ID. The drone management information 326 includes both information about a drone 200 which requests accompanying travel and information about a drone 200 which takes on delivery. The current state of the drone includes an accompanying travel state, a delivery state, and the like.

The determinator 334 determines a flight plan of the drone 200 including a section in which the drone 200 will be mounted on the vehicle 100 on the basis of an action plan and the like acquired by the acquisitor 331 with reference to the map data 323. Further, the determinator 334 may determine a flight plan including a plurality of sections in which the drone 200 will be mounted on different vehicles 100.

For example, when the accompanying travel manager 332 indicates creation of a flight plan, the determinator 334 creates flight plans from a departure place to a destination which includes sections in which the drone 200 will be mounted on all vehicles 100 which are accompanying travel candidates with reference to the map data 323 and action plans of vehicles 100. The determinator 334 determines, as a flight plane of the drone 200, a flight plan including a flight route determined by the accompanying travel manager 332 as an optimal route from among the created flight plans.

When the delivery manager 333 indicates creation of a flight plan, the determinator 334 creates a flight plan from a departure place to a destination which includes a section in which the drone 200 in a state of holding a delivery will be mounted on a vehicle 100 which has requested delivery from the departure place with reference to the map data 323 and an action plan of the vehicle 100.

For example, the determinator 334 may determine a position (hereinafter referred to as a merging point) at which the drone 200 merges with the vehicle 100 on the basis of the action plan of the vehicle 100, the departure place and the destination of the drone 200, and the like. The determinator 334 creates a flight plan of the drone 200 on the basis of the determined merging point.

The determinator 334 determines a timing at which the drone 200 approaches the vehicle 100 (hereinafter referred to as an approaching timing) on the basis of the action plan of the vehicle 100, and the like. The determinator 334 creates a flight plan for controlling the drone 200 such that the drone 200 approaches the vehicle 100 at the determined approaching timing. The determinator 334 may correct a part of the created flight plan on the basis of the determined merging point and approaching timing.

For example, the determinator 334 may refer to the storage unit 320 and derive a future travel distance and travel time of the vehicle 100 and the drone 200 (hereinafter referred to as an approaching vehicle 100J and an approaching drone 200J) which will approach each other, determine a point at which the approaching vehicle 100J and the approaching drone 200J can merge as a merging point, and create a flight plan such that the approaching drone 200J approaches the approaching vehicle 100J at the determined merging point. Further, the determinator 334 may determine a point at which the approaching vehicle 100J and the approaching drone 200J merge within a shortest time as a merging point, or in environments in which merging is not easily performed, set a point at which a road state becomes an environment in which merging is easily performed as a merging point in consideration of the road state.

In addition, the determinator 334 determines a timing which satisfies conditions suitable for approaching (hereinafter referred to as approaching conditions) as an approaching timing within a predetermined range (hereinafter referred to as an approaching area) including the merging point with reference to the storage unit 320. The approaching area includes a range within a predetermined distance from the merging point, a range within a predetermined travel time from the merging point, and the like. The approaching conditions include, for example, a condition that a travel speed of the vehicle 100 is equal to or less than a predetermined speed, a condition that an event of the vehicle 100 is a predetermined event (e.g., a deceleration event, a stop event, or the like), a condition that a corresponding place is a place where other vehicles are stop or decelerate, and the like. Places where a vehicle stops or decelerates include, for example, a place where there is a signal which turns on a red light at an arrival timing, a tollgate, a curve, and the like.

Furthermore, the determinator 334 requests deceleration of the approaching vehicle 100J when a predetermined range including the merging point does not have a timing which satisfies the approaching conditions. For example, the determinator 334 may transmit, to the approaching vehicle 100J, information for requesting deceleration within a predetermined range including the merging point using the communication device 310. Here, the determinator 334 may notify an occupant of the approaching vehicle 100J that an incentive will be provided when the request for deceleration is accepted and provide the incentive to the occupant of the approaching vehicle 100J which has decelerated according to the request for deceleration. The determinator 334 stores information about the provided incentive in incentive information 327 of the storage unit 320. The incentive information 327 is information for managing incentives possessed by a user and is, for example, information in which information indicating an incentive, a provision date and time, the term of validity, and the like are associated with a user ID. The information indicating an incentive includes the number of points, an incentive type, and the like.

Figure 10:
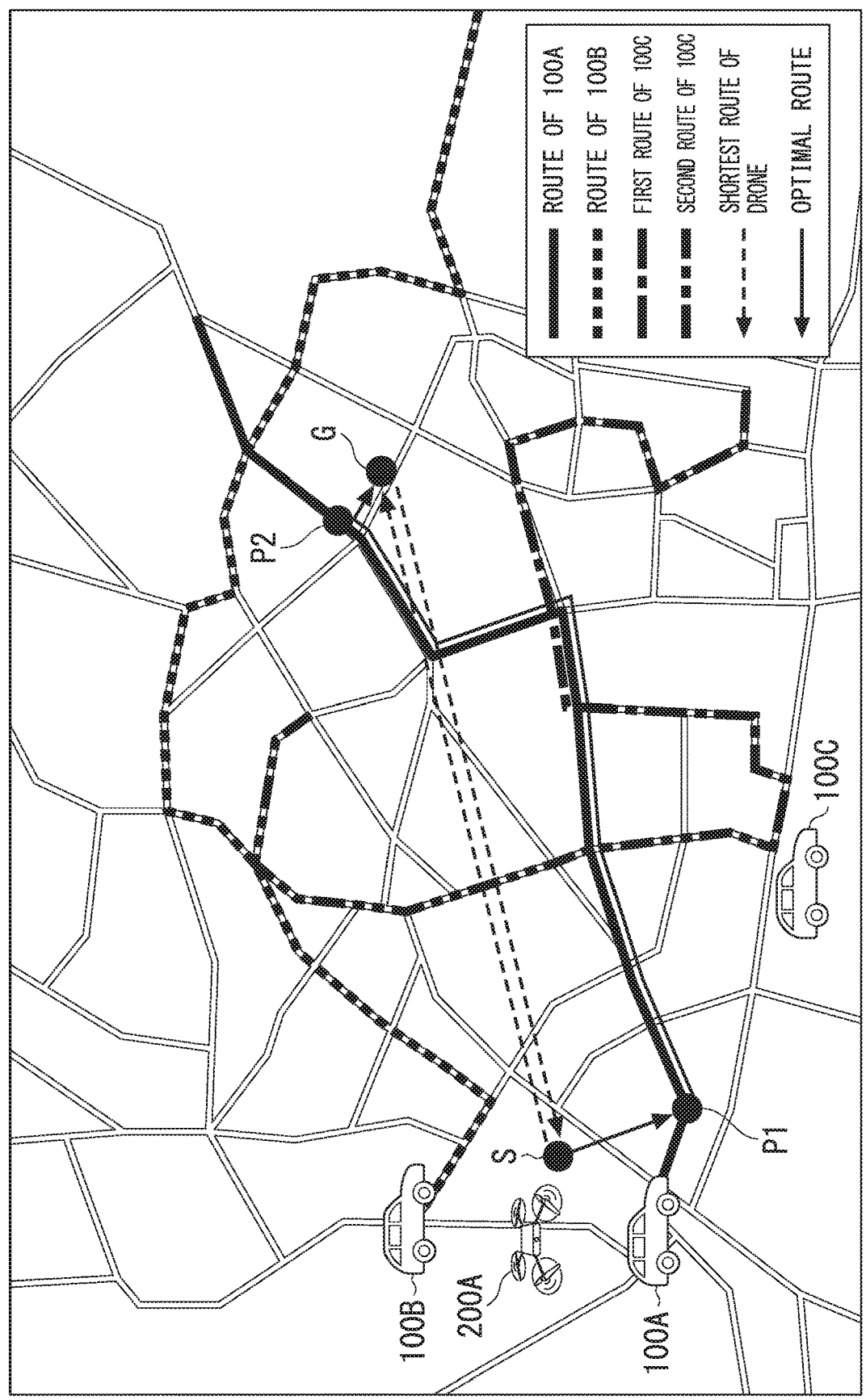
FIG. 10 is an explanatory diagram illustrating an example in which a drone 200A accompanies a vehicle 100A.
Figure 11:
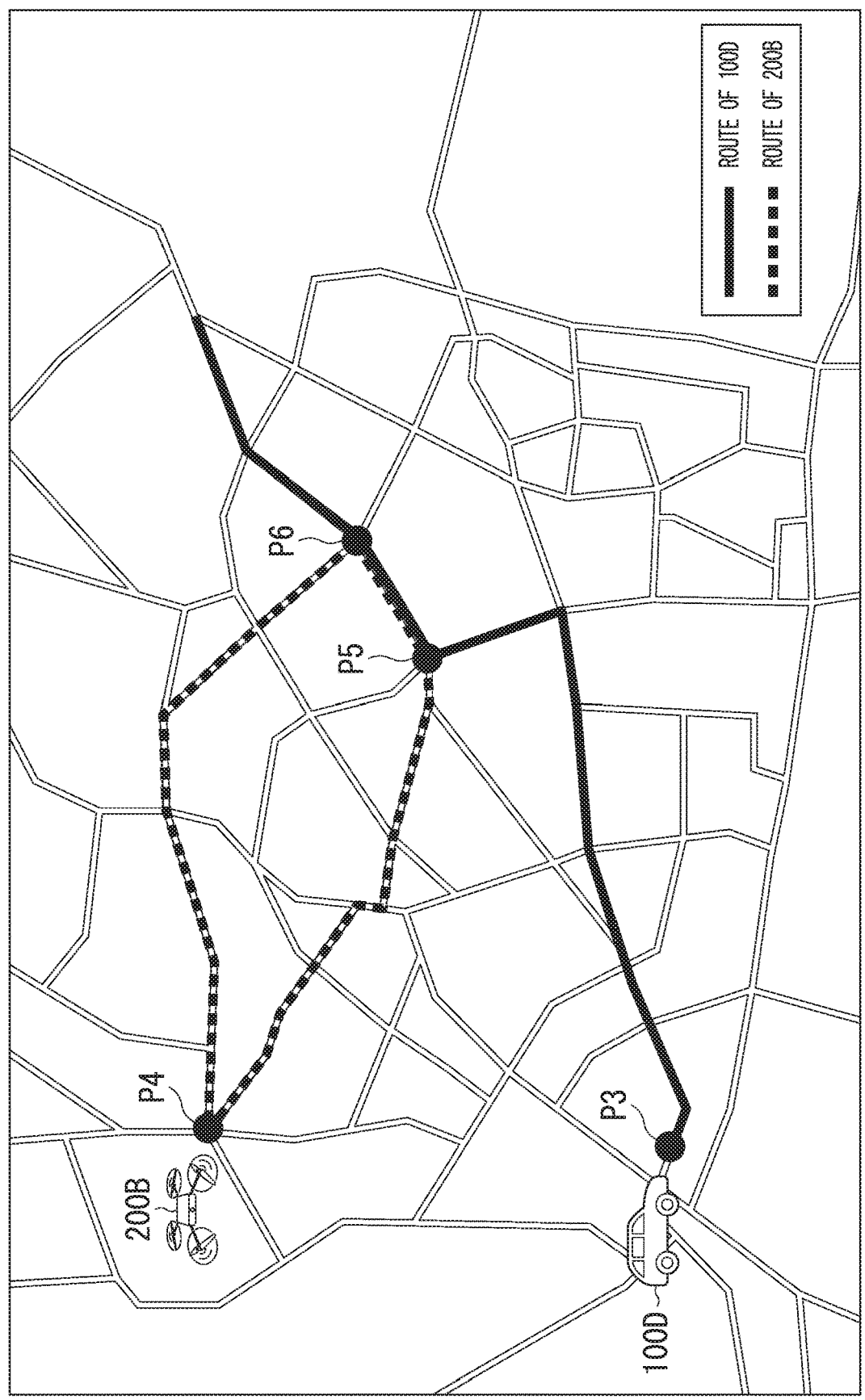
FIG. 11 is an explanatory diagram illustrating an example in which a drone 200B performs delivery to a vehicle 100B.

Here, an example of creating a flight plan will be described with reference to FIGS. 10 and 11. First, an example in which a drone 200A requests accompanying travel and travels accompanying with a vehicle 100A will be described with reference to FIG. 10. FIG. 10 is an explanatory diagram illustrating an example in which the drone 200A travels accompanying with a vehicle 100A.

The drone 200A is scheduled to move from a departure place S to a designation G. A shortest route is a straight line connecting the departure place S to the destination G. However, when the distance from the departure place S to the destination G is a long distance exceeding a distance the drone 200A can fly, the drone 200A or a manager who manages the drone 200A requests accompanying travel with a vehicle 100 for the drone coordination device 300.

Then, the drone coordination device 300 creates a flight plan of the drone A on the basis of action plans of a plurality of vehicles 100A, 100B and 100C which are accompanying travel candidates and travel around the departure place S and the destination G. For example, the determinator 334 of the drone coordination device 300 may determine a point at which the vehicle 100A can merge with the drone 200A which has started from the departure place S within a shortest time on a route of the vehicle 100A as a merging point P1 and determine a point closest to the destination G on the route of the vehicle 100A as a branch point P2 on the basis of an action plan of the vehicle 100A. Then, the determinator 334 creates a flight plan in which the drone 200A flies from the departure place S to the merging point P1, travels accompanying with the vehicle 100A from the merging point P1 to the branch point P2 and flies from the branch point P2 to the destination G. The determinator 334 determines a route including the action plan of the vehicle 100A from among the vehicles 100A, 100B and 100C as an optimal route.

The drone 200A flies according to a flight plan determined as an optimal route and flies to the merging point P1 at which the drone 200A merges with the vehicle 100A. The drone 200A merging with the vehicle 100A at the merging point P1 travels in parallel with the vehicle 100A until arriving at an approaching timing. When the approaching timing has arrived, the drone 200A approaches the vehicle 100A and is connected to the vehicle 100A through the supporting mechanism 101. During connection, the drone 200A may charge the charging device 270 with power supplied from the vehicle 100A. When the vehicle 100A travels to the branch point P2, the connection state using the supporting mechanism 101 is canceled and the drone 200A flies to the destination G.

Next, an example in which a vehicle 100D requests delivery will be described with reference to FIG. 11. FIG. 11 is an explanatory diagram illustrating an example in which a drone 200B makes a delivery to the vehicle 100D. The vehicle 100D requests a delivery for the drone coordination device 300 at a point P3. The drone coordination device 300 selects the drone 200B from among a plurality of drones 200. A requested delivery is attached to the drone 200B by a staff. The determinator 334 of the drone coordination device 300 determines, as a flight plan of the drone 200B, a route through which the drone 200B flies from a delivery center P4 to a merging point P5 at which the drone 200B merges with the vehicle 100D, travels accompanying with the vehicle 100D from the merging point P5 to a branch point P6 to deliver the delivery and returns to the delivery center P4 from the branch point P6.

For example, the determinator 334 may determine a point at which the vehicle 100D can merge with the drone 200B which has started from the delivery center P4 within a shortest time on a route of the vehicle 100D as the merging point P5 and determine a point at which a time predetermined as a time sufficient for handover of the delivery can be secured as the branch point P6 on the basis of an action plan of the vehicle 100D.

The drone 200B flies according to the flight plan and flies from the delivery center P4 to the merging point P5. The drone 200B which has merged with the vehicle 100D at the merging point P5 travels in parallel with the vehicle 100D until arrival at an approaching time. When the approaching timing is arrived, the drone 200B approaches the vehicle 100D to be connected to the vehicle 100D through the supporting mechanism 101. During connection, the drone 200B may charge the charging device 270 with power supplied from the vehicle 100D. The vehicle 100D cancels the connection state by the supporting mechanism 101 when reception of the delivery or charging is completed. Then, the drone 200B flies from the branch point P6 to the delivery center P4. Meanwhile, the drone 200B may travel accompanying with other vehicles 100 in traveling from the delivery center P4 to the merging point P5 and from the branch point P6 to the delivery center P4.

Figure 12:
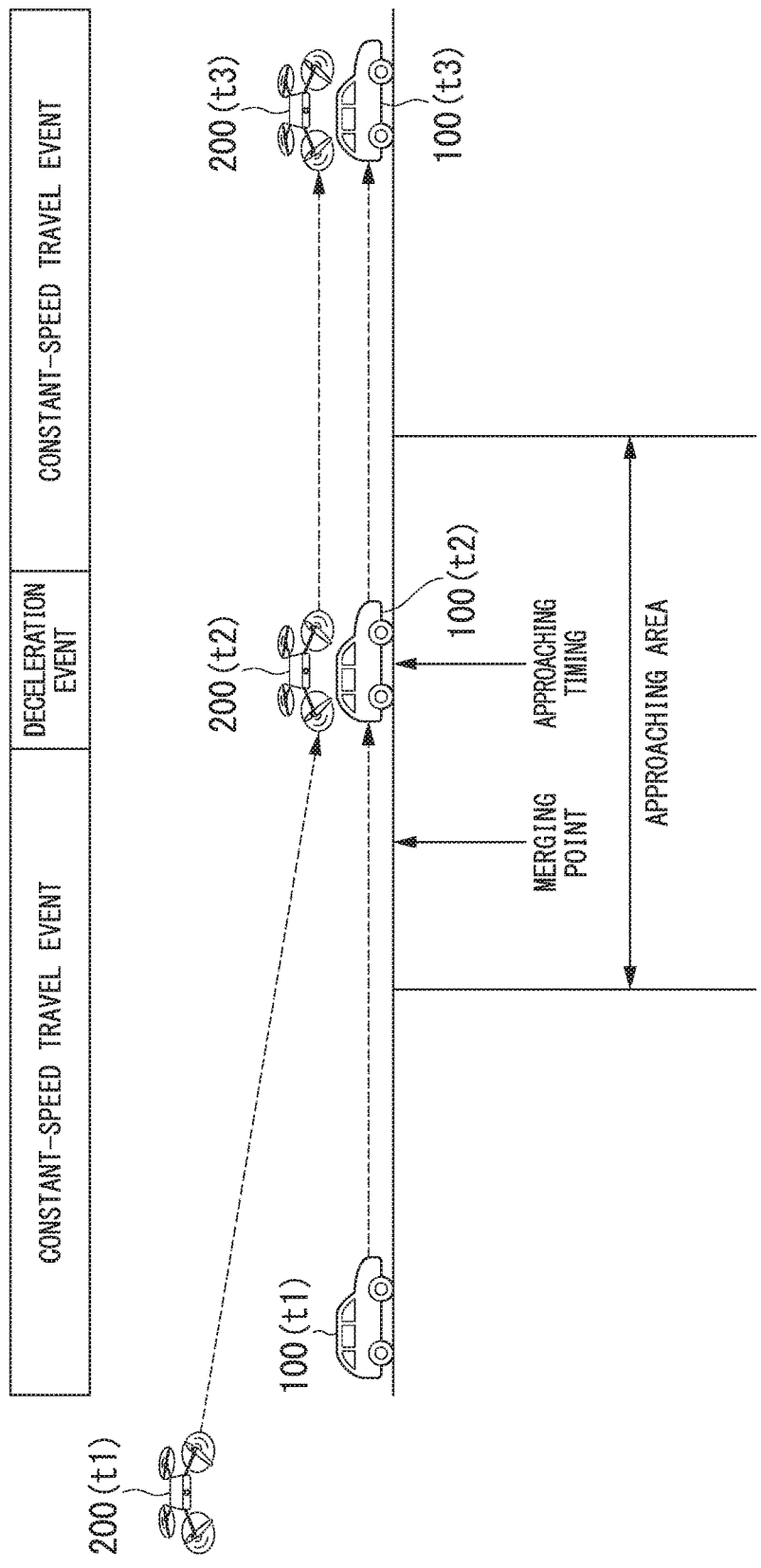
FIG. 12 is a diagram for describing a merging point, an approach area and an approach timing.

Here, a merging point, an approaching area and an approaching timing will be described with reference to FIG. 12. FIG. 12 is an explanatory diagram illustrating a state in which a drone 200 is approaching a vehicle 100. As illustrated in FIG. 12, a predetermined range including a merging point is an approaching area and an approaching timing is set to a timing which satisfies approaching conditions within the approaching area.

At a time t1, a vehicle 100(t1) is traveling through a constant-speed travel event and a speed per hour thereof is 60 km. In addition, a drone 200(t1) is flying slightly behind the vehicle 100(t1) at the time t1. The approaching timing is set to a time t2 at which a deceleration event is executed. Thereafter, the vehicle 100(t2) decelerates to a speed per hour of 30 km according to execution of the deceleration event at a time t2 and the vehicle 100(t3) is traveling at a constant speed of 30 km at a time t3. The drone 200(t2) approaches the vehicle 100(t2) to be connected thereto at the time t2 and the drone 200(t3) moves in a state in which the drone 200(t3) is mounted on the vehicle 100(t3) at the time t3.

[Flowchart]

Figure 13:
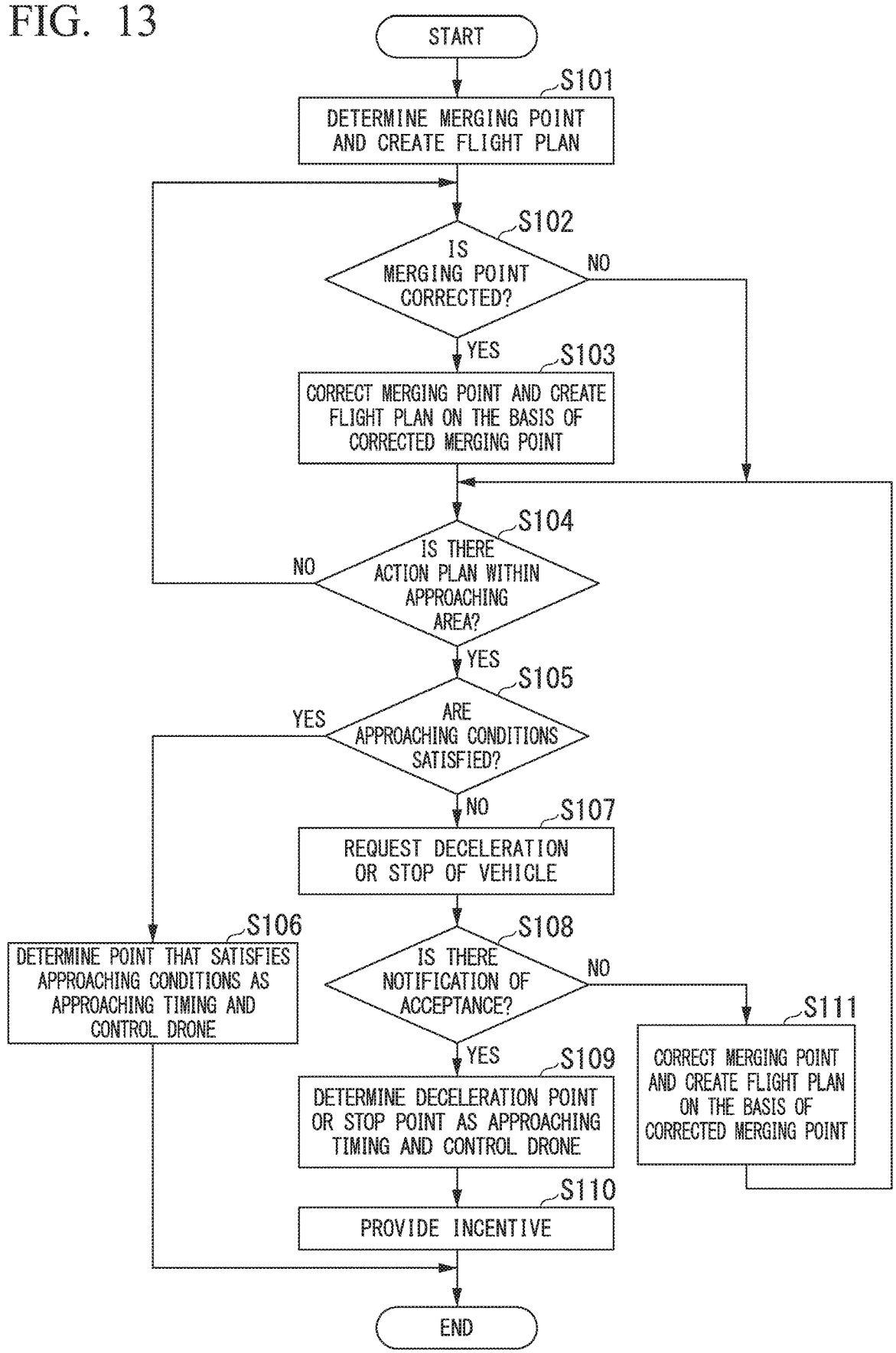
FIG. 13 is a flowchart illustrating an example of a processing operation in a determination unit 334.

Next, an example of a processing operation in the determinator 334 will be described with reference to FIG. 13. FIG. 13 is a flowchart illustrating an example of a processing operation in the determinator 334.

First, the determinator 334 determines a merging point with reference to the vehicle information 321 and the drone information 322, creates a flight plan of the drone 200 on the basis of the determined merging point, and transmits the flight plan to the drone 200 using the communication device 310 (step S101). Subsequently, the determinator 334 determines whether a newest merging point needs to be corrected (step S102). Cases in which a merging point needs to be corrected include, for example, a case in which the drone 200 arrives at the merging point early due to decrease in a travel speed of the vehicle 100 caused by congestion, vehicle stop or the like, a case in which the vehicle 100 arrives at the merging point early due to an acceleration of the vehicle 100 or the like, and the like.

When it is determined that the newest merging point needs to be corrected, the determinator 334 corrects the merging point with reference to the vehicle information 321 and the drone information 322, creates a flight plan of the drone 200 on the basis of the corrected merging point, and transmits the flight plan to the drone 200 using the communication device 310 (step S103). Subsequently, the determinator 334 determines whether an action plan of the vehicle 100 on a road within an approaching area has been acquired (step S104). When the action plan of the vehicle 100 on the road within the approaching area has not been acquired, the determinator 334 returns to processing of step S102.

On the other hand, when it is determined that the action plan of the vehicle 100 on the road within the approaching area has been acquired, the determinator 334 determines whether there is a timing which satisfies approaching conditions on the road within the approaching area in a route of the vehicle 100 on the basis of the acquired action plan of the vehicle 100 (step S105). For example, the determinator 334 may determine whether there is a timing at which a deceleration event or a stop event is executed. When it is determined that there is a timing which satisfies the approaching conditions, the determinator 334 determines the timing which satisfies the approaching conditions as an approaching timing, creates a flight plan for instructing the drone 200 to approach the vehicle 100 in accordance with the approaching timing and transmits the flight plan to the drone 200 using the communication device 310 (step S106).

When it is determined that there is no timing which satisfies the approaching conditions in step S105, the determinator 334 transmits a request for requesting deceleration or stop to the vehicle 100 using the communication device 310 (step S107). When a notification indicating acceptance of deceleration or stop is received from the vehicle 100 (step S108), the determinator 334 determines a deceleration or stop timing as an approaching timing on the basis of the action plan received from the vehicle 100, creates a flight plan for instructing the drone 200 to approach the vehicle 100 in accordance with the approaching timing and transmits the flight plan to the drone 200 using the communication device 310 (step S109). Then, the determinator 334 provides a predetermined incentive to an occupant of the vehicle 100 (or the vehicle) (step S110).

When the notification indicating acceptance of deceleration or stop is not received from the vehicle 100 in step S108, the determinator 334 corrects the merging point with reference to the vehicle information 321 and the drone information 322, creates a flight plan of the drone 200 on the basis of the corrected merging point and transmits the flight plan to the drone 200 using the communication device 310 (step S111). For example, the determinator 334 may set a point in a direction a predetermined distance ahead of the merging point on the route of the vehicle 100 as the corrected merging point.

Meanwhile, although a request for requesting deceleration or stop is transmitted in the aforementioned processing of the flowchart, a request with respect to modification of the action plan different from deceleration or stop may be transmitted instead of this. Further, the predetermined incentive is derived, for example, by the calculation basis below. The predetermined incentive is derived, for example, on the basis of a time (or fuel expenses) increased until arrival at a destination caused by deceleration, stop, route change or the like according to a request transmitted by the determinator 334, a travel resistance or energy increase occurring due to power supply during traveling, or the like. Further, the predetermined incentive may be derived on the basis of a distance and time in which/for which the vehicle 100 moves carrying the drone 200, the number of carried drones, and the value of a consignment carried by the drone 200 (a risk shifted onto the vehicle 100).

[Sequence Diagram]

Figure 14:
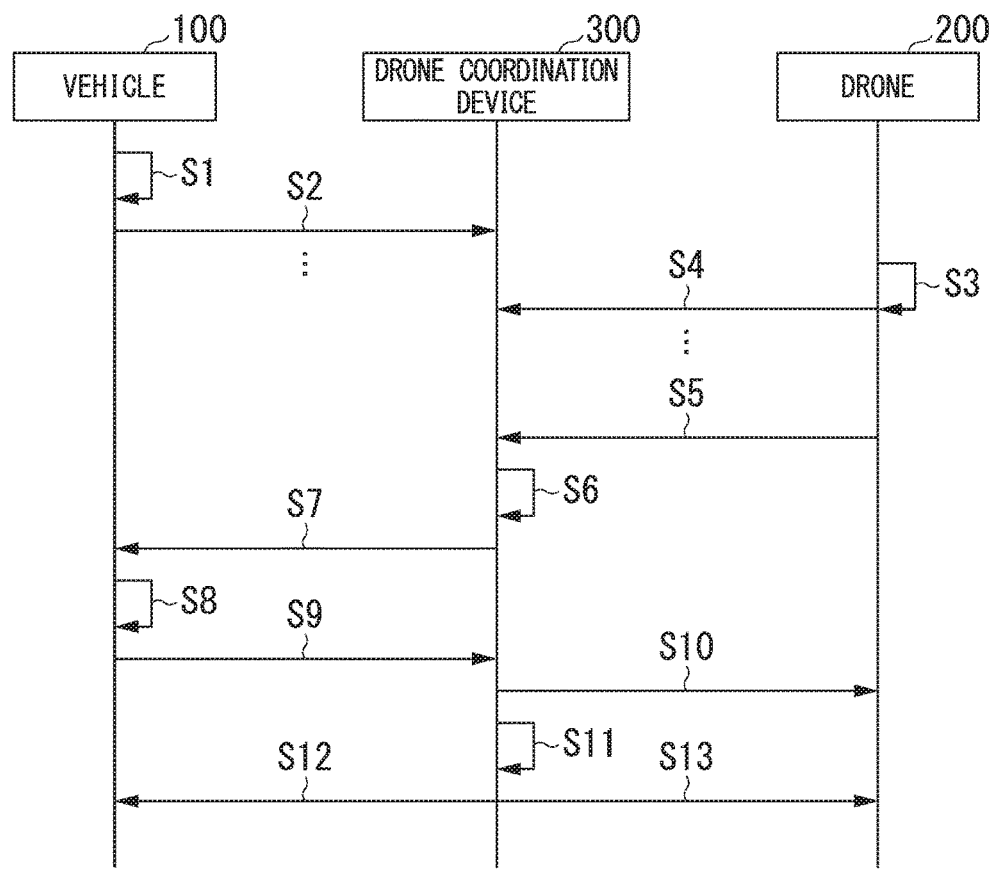
FIG. 14 is a sequence diagram illustrating an example of a processing operation in response to an accompanying travel request.

Next, an example of a processing operation in the drone coordination system 1 will be described with reference to FIGS. 14 and 15. FIG. 14 is a sequence diagram illustrating an example of a processing operation in response to an accompanying travel request.

The vehicle 100 acquires positional information representing the position of the vehicle 100 and an action plan (step S1) and regularly transmits the positional information and the action plan to the drone coordination device 300 using the communication device 120 (step S2). In addition, the drone 200 also acquires positional information representing the position of the drone 200 and a flight plan (step S3) and regularly transmits the positional information and the flight plan to the drone coordination device 300 using the communication device 210 (step S4).

Subsequently, the drone 200 transmits a request for requesting accompanying travel to the drone coordination device 300 using the communication device 210 (step S5). The drone coordination device 300 determines the vehicle 100 with which the drone 200 will accompany on the basis of a flight route of the drone 200 (step S6) and transmits a request for requesting accompanying travel of the drone 200 to the determined vehicle 100 (step S7). The vehicle 100 transmits acceptance information to the drone coordination device 300 using the communication device 120 (step S9), for example, when an acceptance of accompanying travel is received from an occupant using the input/output unit 171 (step S8). Then, the drone coordination device 300 creates a flight plan of the drone 200 and transmits the flight plan along with a flight start instruction to the drone 200 using the communication device 310 (step S10).

Subsequently, the drone coordination device 300 determines an approaching timing (step S11).

The drone coordination device 300 transmits the determined approaching timing to the vehicle 100 using the communication device 310 (step S12). Further, the drone coordination device 300 creates or corrects the flight plan on the basis of the approaching timing and transmits the flight plan to the drone 200 using the communication device 310 (step S11).

Figure 15:
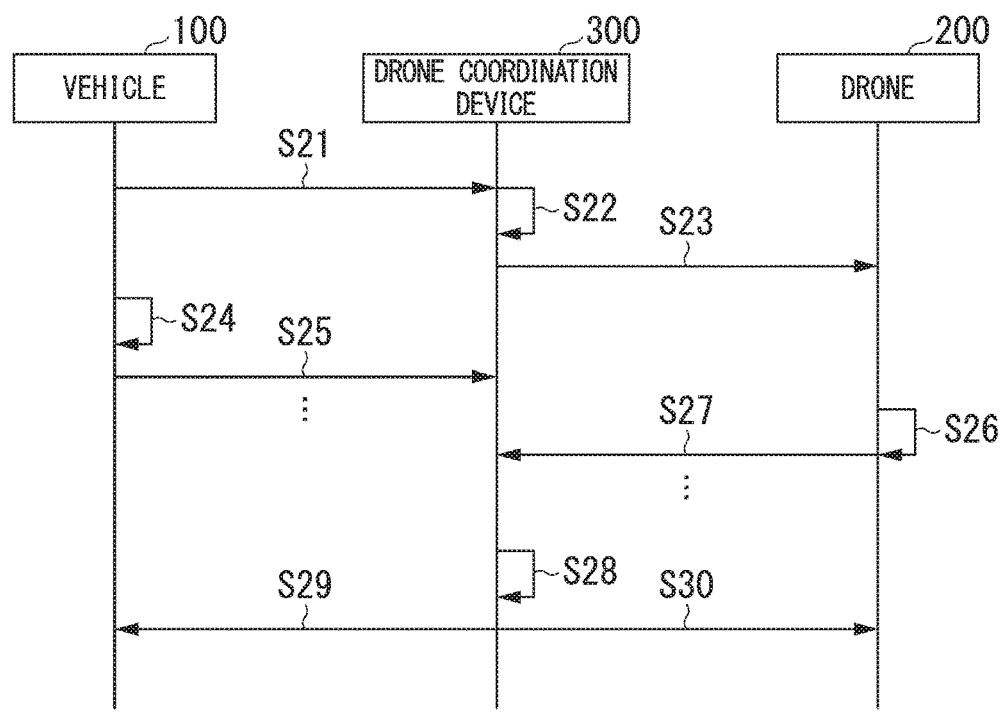
FIG. 15 is a sequence diagram illustrating an example of a processing operation in response to a delivery request.

FIG. 15 is a sequence diagram illustrating an example of a processing operation in response to a delivery request. The vehicle 100 transmits a request for requesting delivery to the drone coordination device 300 using the communication device 120 (step S21). The drone coordination device 300 determines a drone 200 which will deliver a delivery to the vehicle 100 on the basis of the received request (step S22). The drone coordination device 300 creates a flight plan of the drone 200 and transmits the flight plan along with a flight start instruction to the drone 200 determined using the communication device 310 (step S23).

The vehicle 100 acquires positional information representing the position of the vehicle 100 and an action plan (step S24) and regularly transmits the positional information and the action plan to the drone coordination device 300 using the communication device 120 (step S25). Further, the drone 200 also acquires positional information representing the position of the drone 200 and a flight plan (step S26) and regularly transmits the positional information and the flight plan to the drone coordination device 300 using the communication device 210 (step S27).

Subsequently, the drone coordination device 300 determines an approaching timing (step S28). The drone coordination device 300 transmits the determined approaching timing to the vehicle 100 using the communication device 310 (step S29). Further, the drone coordination device 300 creates or corrects the flight plan on the basis of the approaching timing and transmits the flight plan to the drone 200 using the communication device 310 (step S30).

According to the above-described embodiment, it is possible to temporarily mount, on the vehicle 100, the acquisitor 331 which acquires an action plan from the vehicle 100, the determinator 334 which determines a flight plan of the drone 200 including a section in which the drone 200 will be mounted on the vehicle 100 on the basis of the action plan acquired by the acquisitor 331, and the drone 200 and thus can support coordination of the vehicle 100 and the drone 200.

The drone 200 approaches the vehicle 100 at a timing at which the vehicle 100 decelerates or stops and thus the drone 200 and the vehicle 100 can smoothly approach each other.

Even when a timing at which the vehicle 100 decelerates or stops is not acquired, the drone 200 can be caused to smoothly approach the vehicle 100 by requesting deceleration or stop of the vehicle 100. In addition, a service coordinated with the drone 200 can be easily provided by providing an incentive.

It is possible to reduce a flight distance of the drone and receive supply of power from the vehicle 100 by causing the drone 200 to travel accompanying with the vehicle 100. Accordingly, it is possible to considerably increase a travel distance of the drone 200.

An occupant of the vehicle 100 can take products without stopping by a store by causing the drone 200 to deliver deliveries and thus convenience can be improved and loss of time caused by shopping can be reduced. Furthermore, products can be purchased even in a place where there is no store at a short distance.

Second Embodiment

Hereinafter, a second embodiment will be described. The second embodiment will be described using an example in which a third operator (hereinafter, a management proxy) different from a manager of the vehicle 100 and a management of the drone 200 comprehensively manages the vehicle 100 and the drone 200 using the drone coordination device 300 and a vehicle management device 510.

The management proxy manages one or more vehicles 100 using the vehicle management device 510. The vehicle 100 may be a possession of the management proxy or a vehicle whose owner authorizes accompanying travel of the drone 200 of the vehicle 100 and deputes a procedure with respect to accompanying travel to the management proxy.

Figure 16:
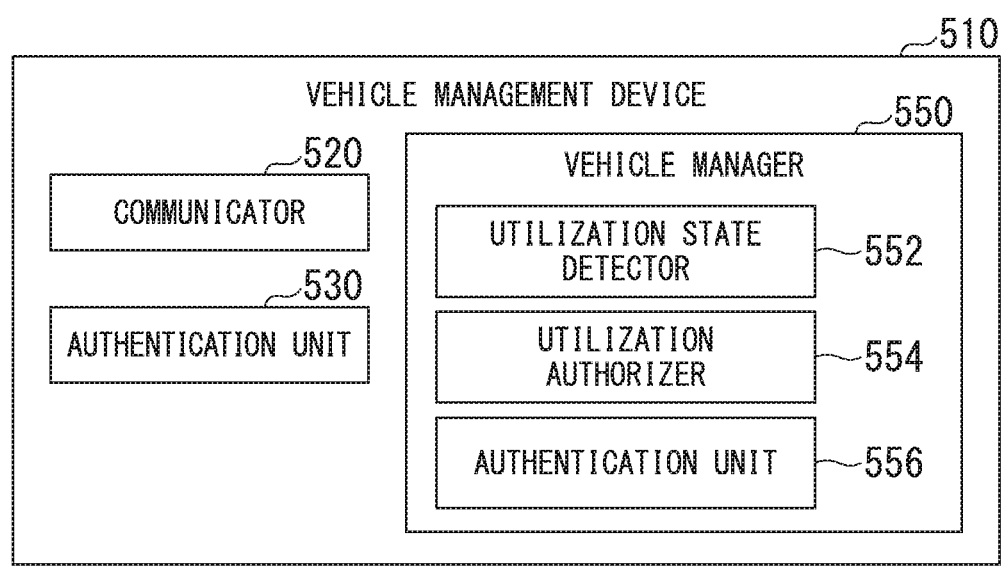
FIG. 16 is a functional configuration diagram of a vehicle management device 510.

FIG. 16 is a functional configuration diagram of the vehicle management device 510. The vehicle management device 510 includes, for example, a communicator 520, an authentication unit 530 and a vehicle manager 550.

The communicator 520 is a wireless communication device. The communicator 520 communicates with the drone coordination device 300 through the network NW. The authentication unit 530 performs processing of authenticating whether the drone 200 may be caused to travel accompanying with the vehicle 100 according to an instruction of the drone coordination device 300. The vehicle manager 550 manages the vehicle 100 assigned to travel accompanying with the drone 200 by the management proxy from starting of accompanying travel of the drone 200 to completion thereof.

The communicator 520 causes the vehicle manager 550 to authenticate the vehicle 100 suitable for accompanying travel on the basis of a utilization request (i.e., a request for accompanying travel of the drone 200) transmitted by the drone coordination device 300 and transmits information for identifying the authenticated vehicle 100 to the drone coordination device 300. Processing of authenticating the vehicle 100 suitable for accompanying travel performed by the vehicle manager 550 will be described later.

The vehicle manager 550 includes, for example, a utilization state detector 552, a utilization authorizer 554 and an authentication unit 556. The utilization state detector 552 detects a utilization state of the drone 200 authenticated by the authentication unit 530. The utilization state is, for example, a state of traveling accompanying with the vehicle 100 or a state in which power is supplied from the vehicle 100.

In addition, the utilization state detector 552 acquires an action plan from the vehicle 100 and detects whether the vehicle 100 is suitable as an accompanying travel target of the drone 200 authenticated by the authentication unit 530. The utilization state detector 552 is an example of a "state acquisitor" or a "result derivation unit."

The utilization state detector 552 determines a utilization state of the vehicle 100 and/or the drone 200 authenticated by the authentication unit 530. The utilization state is, for example, an accompanying travel state in which the vehicle 100 and the drone 200 start accompanying travel, a state in which the vehicle 10 and the drone 200 end accompanying travel, or the like. In addition, the utilization state may be a state of the vehicle 100 such as a state in which the vehicle 100 can accept accompanying travel of the drone 200, a state in which the vehicle 100 cannot accept accompanying travel of the drone 200, a state in which the vehicle 100 can accept accompanying travel of the drone 200 but cannot supply power, or the like. Further, when the vehicle 100 and drone 200 authenticated by the authentication unit 530 are not in an accompanying travel state, the utilization state detector 552 determines whether states of the vehicle 100 and the drone 200 can be set to an accompanying travel state (in which the vehicle 100 accepts the drone 200 authenticated by the authentication unit 530). The utilization state detector 552 outputs information for identifying one or more vehicle 100 and/or one or more drones 200 authenticated by the authentication unit 530 which can be caused to be in an accompanying travel state to the utilization authorizer 554. Information for identifying the drone 200 authenticated by the authentication unit 530 includes information about a route section and a demand for power supply.

In addition, the utilization state detector 552 selects a vehicle 100 suitable for accompanying travel of the drone 200 with reference to information about a route of the drone 200 and information about a status provided from the drone coordination device 300. When there is no vehicle 100 suitable for accompanying travel of the drone 200, the utilization state detector 552 may determine assignment of a vehicle 100 traveling in a section suitable for accompanying travel of the drone 200 and assign the drone 200 to a vehicle 100 waiting in a parking space, or the like. The utilization state detector 552 may instruct a vehicle 100 whose route can be changed to update the route to travel along a route suitable for accompanying travel of the drone 200 or update a route when there is no vehicle 100 suitable for accompanying travel of the drone 200.

The utilization authorizer 554 generates pairing candidates (candidates of combinations of drones 200 authenticated by the authentication unit 530 and vehicles 100 which accept accompanying travel of drones 200 authenticated by the authentication unit 530) from information for identifying vehicles 100 and drones 200 authenticated by the authentication unit 530 which is output from the utilization state detector 552. Pairing is generated after a route section in which the drone 200 can be mounted on the vehicle 100 has been determined.

The utilization authorizer 554 authorizes the drone 200 authenticated by the authentication unit 530 to be into an accompanying travel state with the vehicle 100, for example, when authentication has been successfully performed by the authentication unit 556. The authentication unit 556 selects a vehicle 100 which may be paired with the drone 200 authenticated by the authentication unit 530 and authenticates the vehicle 100 as a vehicle traveling accompanying with the drone 200.

In addition, the utilization state detector 552 detects a result of utilization of accompanying travel of the vehicle 100 and the drone 200. For example, a result of utilization may be a result that is a basis of calculation of a predetermined incentive. The utilization state detector 552 may use the accompanying travel management information 324 and the incentive information 327 acquired by the vehicle 100, transmitted and acquired from the vehicle 100 for detection of a utilization result.

The vehicle management device 510 provides a predetermined incentive to the vehicle 100 on the basis of the utilization result detected by the utilization state detector 552. The provided incentive may be output to the navigation device 130 of the vehicle 100 or the like at a timing at which the incentive is provided or the owner of the vehicle 100 may be notified of the incentive through mail or the like.

Meanwhile, the vehicle management device 510 may replace some functions of the vehicle 100. For example, when the vehicle 100 and the drone 200 have different communication standards and they cannot directly communicate with each other, and the like, the vehicle management device 510 replaces some functions of the vehicle 100. Specifically, the vehicle management device 510 receives a vehicle operation request (e.g., a request for deceleration during merging) of the drone 200 through the drone coordination device 300 and transmits a signal for requesting an operation in response to the vehicle operation request to the vehicle 100.

Figure 17:
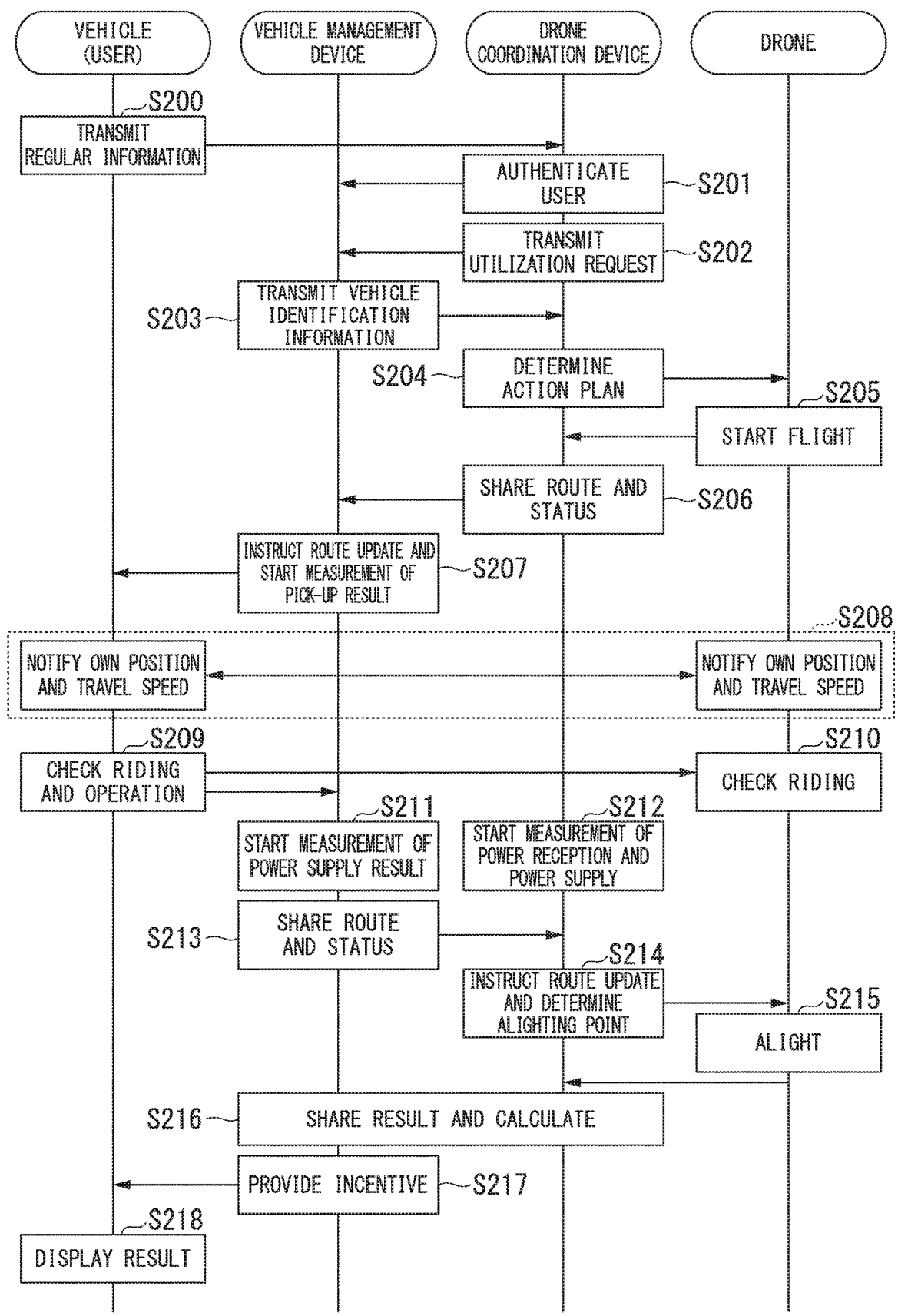
FIG. 17 is a sequence diagram illustrating an example of a processing operation of managing the vehicle 100 and the drone 200 by a third operator.

FIG. 17 is a sequence diagram illustrating an example of a processing operation of managing the vehicle 100 and the drone 200 by a third operator.

First, the vehicle 100 transmits the vehicle information 321 which is regularly transmitted to the drone coordination device 300 (step S200). Next, the drone coordination device 300 performs user authentication processing (step S201). Then, the drone coordination device 300 transmits a utilization request to the vehicle management device 510 (step S202). Then, the vehicle management device 510 transmits vehicle identification information to the drone coordination device 300 (step S203).

Next, the drone coordination device 300 determines an action plan of the drone 200 and transmits the action plan to the drone 200 (step S204). The drone 200 starts flight according to the action plan (step S205). The drone coordination device 300 transmits information about a route and a status of the drone 200 to the vehicle management device 510 and shares the information (step S206). The vehicle management device 510 transmits a route update instruction to the vehicle 100 and starts measurement of pick-up results (step S207).

At a merging point, the vehicle 100 and the drone 200 notify each other of positional information and travel speeds thereof (step S208). Next, the vehicle 100 checks riding/operation of the drone 200 (step S209) and the drone 200 checks riding on the vehicle 100 (step S210). Thereafter, the vehicle management device 510 starts measurement of results of power supply from the vehicle management device 510 to the drone 200 (step S211) and the drone coordination device 300 starts measurement of results of power reception and power supply of the drone 200 (step S212).

The vehicle management device 510 shares route and status information with the drone coordination device 300 (step S213). When route update is required, the drone coordination device 300 transmits an instruction for route update to the drone 200. Further, the drone coordination device 300 determines an alighting point of the drone 200 and transmits information indicating the determined alighting point to the drone 200 (step S214).

At the alighting point, the drone 200 alights from the vehicle 100 and notifies the drone coordination device 300 that the drone 200 has alighted (step S215). The drone coordination device 300 and the vehicle management device 510 share results of accompanying travel of the vehicle 100 and the drone 200 and perform calculation (step S216). Then, the vehicle management device 510 provides an incentive to the vehicle 100 (step S217). Information about the incentive provided by the vehicle management device 510 is output to the navigation device 130 of the vehicle 100 (step S218). Processing of this sequence diagram ends.

Meanwhile, results of accompanying travel shared in step S216 include, for example, positional information of starting and end points of actual accompanying travel, a travel distance therebetween, starting/end time, results of amounts of power reception and supply in an accompanying travel period, results of detachment/attachment or operation of articles on a vehicle, and the like. The vehicle management device 510 or the drone coordination device 300 carries out calculation for operation during an accompanying travel period with reference to a reference table showing amounts of money which is not shown on the basis of the aforementioned information, mass information or size and operation costs of the drone 200, category information indicating a conveyance object, and the like.

While forms for embodying the present invention have been described using embodiments, the present invention is not limited to these embodiments and various modifications and substitutions can be made without departing from the spirit or scope of the present invention.

For example, all or some components of the drone coordination device 300 may be amounted in the vehicle 100.

In addition, the drone coordination device 300 may transmit the position and flight state (on time, delay, or the like) of the drone 200, an expected time of arrival at the vehicle 100, and the like to the vehicle 100 using the communication device 310. Accordingly, an occupant of the vehicle 100 can ascertain the state of the drone 200.

Furthermore, the drone coordination device 300 may transmit the position and travel state (on time, delay or the like) of the vehicle 100, an expected time of arrival at a merging position, and the like to the drone 200 using the communication device 310. Accordingly, the drone 200 can adjust a flight speed or change a part of a flight route.

In addition, the drone coordination device 300 may monitor the position of the drone 200 using the drone information 322, and when the drone 200 has moved to a place other than a flight plan, notify the manager of the drone 200 of error information or cause the drone 200 to output a notification sound. Accordingly, it is possible to provide an anticrime measure of the drone 200.

Further, the drone 200 may move along a shortcut flight route when a time is taken for movement of the vehicle 100 at an intersection or the like while the drone 200 is traveling in parallel with the vehicle 100.

Furthermore, the drone 200 may supply power to the vehicle 100. In such a case, the incentive information 327 acquired by the vehicle 100 may include the amount of power supply from the drone 200.

REFERENCE SIGNS LIST

1 Drone coordination system
100 Vehicle
110 Outside monitoring unit
120 Communication device
130 Navigation device
140 Recommended lane determination device
150 Automated driving control unit
160 Driving power output device
162 Brake device
164 Steering device
170 Coordinator
171 Input/output unit
172 Storage unit
173 Data manager
174 Coordination manager
200 Drone
210 Communication device
220 Camera
230 GNSS receiver
240 Sensor
250 Motor
260 Holding mechanism
270 Charging device
280 Control unit
290 Storage unit
300 Drone coordination device
310 Communication device
320 Storage unit
321 Vehicle information
322 Drone information
323 Map data
324 Accompanying travel management information
325 Delivery management information
326 Drone management information
327 Incentive information
330 Control unit
331 Acquisitor
332 Accompanying ravel manager
333 Delivery manager
334 Determinator
400 Transportation management device
500 Vehicle manager
510 Vehicle management device
520 Communicator
530 Authentication unit
550 Vehicle manager
552 Utilization state detector
554 Utilization authorizer
556 Authentication unit

The invention claimed is:

1. A drone coordination device comprising:
a processor configured to:
receive an action plan from an automated vehicle;
determine a flight plan of a drone including a section in which the drone will be mounted on the automated vehicle on the basis of the action plan,
instruct the drone to approach the automated vehicle at a timing at which a travel speed of the automated vehicle is equal to or less than a predetermined speed; and
request a change of the action plan for the automated vehicle when there is no timing at which the travel speed of the automated vehicle is equal to or less than the predetermined speed within a predetermined range including a point at which the drone will approach the automated vehicle.

2. The drone coordination device according to claim 1, wherein the processor is configured to determine a flight plan of the drone in a state in which the drone holds a delivery.

3. The drone coordination device according to claim 1, wherein the processor is configured to determine a timing at which the drone will approach the automated vehicle on a basis of the action plan and instructs the drone to approach the automated vehicle at the timing at which the drone will approach the automated vehicle.

4. The drone coordination device according to claim 1, wherein the processor is configured to provide an incentive to the automated vehicle which has changed the action plan according to a request for requesting change of the action plan.

5. The drone coordination device according to claim 1, wherein the processor is configured to determine an automated vehicle on which the drone will be mounted on a basis of a departure place and a destination of the drone and request mounting of the drone in a predetermined section for the automated vehicle.

6. The drone coordination device according to claim 1, wherein the processor is configured to receive a delivery request from the automated vehicle, determine the drone which will deliver a delivery to the automated vehicle on a basis of received delivery details, and request delivery to the automated vehicle by the drone.

7. A vehicle management device comprising:
a processor configured to:
receive an action plan from an automated vehicle;
determine a route section of the automated vehicle in which a drone can be mounted on the automated vehicle on a basis of the action plan and authorize mounting of the drone on the automated vehicle; and
transmit vehicle information of the automated vehicle to the outside while the automated vehicle travels in the route section;
instruct the drone to approach the automated vehicle at a timing at which a travel speed of the automated vehicle is equal to or less than a predetermined speed, and
request change of the action plan for the automated vehicle when there is no timing at which the travel speed of the automated vehicle is equal to or less than the predetermined speed within a predetermined range including a point at which the drone will approach the automated vehicle.

8. The vehicle management device according to claim 7, wherein the processor is configured to receive a vehicle operation request from the outside and output information for identifying a plurality of automated vehicles on a basis of the vehicle operation request, and
receive a state of the automated vehicle on a basis of information for identifying the automated vehicle.

9. The vehicle management device according to claim 7, wherein the processor is further configured to:
detect whether the automated vehicle and the drone are in an accompanying travel state; and derive a utilization result on a basis of at least one of a travel distance and a travel time of the automated vehicle from start to end of the accompanying travel state.

10. The vehicle management device according to claim 9, wherein the processor is configured to cause the automated vehicle to transmit the utilization result to an outside and receive the utilization result transmitted to the outside.

11. The vehicle management device according to claim 9, wherein the processor is configured to receive attribute information of the drone from the automated vehicle and derive the utilization result on a basis of a mass of the drone.

12. The vehicle management device according to claim 11, wherein the attribute information includes mass information of the drone.

13. The vehicle management device according to claim 11, wherein the attribute information includes manufacture information of the drone.

14. A drone coordination method comprising:
acquiring an action plan from an automated vehicle;
determining a flight plan of a drone including a section in which the drone will be mounted on the automated vehicle on the basis of the acquired action plan;
instructing the drone to approach the automated vehicle at a timing at which a travel speed of the automated vehicle is equal to or less than a predetermined speed; and
requesting a change of the action plan for the automated vehicle when there is no timing at which the travel speed of the automated vehicle is equal to or less than the predetermined speed within a predetermined range including a point at which the drone will approach the automated vehicle.

15. A non-transitory computer-readable storage medium that stores an in-vehicle control program to be executed by an in-vehicle computer to perform at least:
acquire an action plan from an automated vehicle;
determine a flight plan of a drone including a section in which the drone will be mounted on the automated vehicle on the basis of the acquired action plan;
instruct the drone to approach the automated vehicle at a timing at which a travel speed of the automated vehicle is equal to or less than a predetermined speed; and
request a change of the action plan for the automated vehicle when there is no timing at which the travel speed of the automated vehicle is equal to or less than the predetermined speed within a predetermined range including a point at which the drone will approach the automated vehicle.

\* \* \* \* \*